United States Patent
Chun et al.

(10) Patent No.: US 10,608,791 B2
(45) Date of Patent: *Mar. 31, 2020

(54) DATA TRANSMISSION METHOD IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Jeongki Kim, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,971

(22) Filed: May 14, 2019

(65) Prior Publication Data

US 2019/0268098 A1    Aug. 29, 2019

Related U.S. Application Data

(63) Continuation of application No. 15/516,325, filed as application No. PCT/KR2015/010379 on Oct. 1, 2015, now Pat. No. 10,320,529.

(Continued)

(51) Int. Cl.
*H04L 1/16* (2006.01)
*H04L 29/06* (2006.01)
(Continued)

(52) U.S. Cl.
CPC .............. *H04L 1/16* (2013.01); *H04B 7/0413* (2013.01); *H04B 7/0452* (2013.01); *H04B 7/063* (2013.01);
(Continued)

(58) Field of Classification Search
CPC ........................................................ H04L 1/16
(Continued)

(56) References Cited

U.S. PATENT DOCUMENTS 9,780,923 B2    10/2017  Noh et al.
10,320,529 B2*  6/2019  Chun .................. H04L 1/16
(Continued)

FOREIGN PATENT DOCUMENTS

JP    2007-288656 A   11/2007
JP    2013-536599 A    9/2013
(Continued)

OTHER PUBLICATIONS

U.S. Appl. No. 15/516,325, filed Mar. 31, 2017.
(Continued)

*Primary Examiner* — Peter G Solinsky
(74) *Attorney, Agent, or Firm* — Birch, Stewart, Kolasch & Birch, LLP

(57) ABSTRACT

A downlink (DL) multi-user (MU) transmission method in a wireless local area network (WLAN) system, the DL MU transmission method including receiving a DL MU physical protocol data unit (PPDU) including a physical preamble and a data field from STA (Station) and transmitting the ACK frames in response to the DL MU PPDU to STA. In addition, the data field includes at least one medium access control (MAC) protocol data unit (MPDU), the at least one MPDU includes a MAC header and a MAC frame body, wherein the MAC header includes acknowledge (ACK) indication information, the ACK indication information includes frequency resource allocation information for an uplink (UL) MU orthogonal frequency division multiple access (OFDMA) transmission of ACK frames and modulation and coding scheme (MCS) level information, and the frequency resource allocation information includes an index value indicating a resource unit allocated for the UL MU OFDMA transmission of the ACK frames, and the resource unit corresponds to a 26-tone resource unit, a 52-tone resource unit, a 106-tone resource unit, a 242-tone resource unit, a 484-tone resource unit, or a 996-tone resource unit.

18 Claims, 35 Drawing Sheets

Related U.S. Application Data

(60) Provisional application No. 62/058,112, filed on Oct. 1, 2014, provisional application No. 62/186,334, filed on Jun. 29, 2015, provisional application No. 62/194,303, filed on Jul. 20, 2015.

(51) Int. Cl.
| | | |
|---|---|---|
| *H04B 7/0452* | (2017.01) | |
| *H04B 7/0413* | (2017.01) | |
| *H04B 7/06* | (2006.01) | |
| *H04L 1/00* | (2006.01) | |
| *H04W 72/04* | (2009.01) | |
| *H04W 84/12* | (2009.01) | |

(52) U.S. Cl.
CPC .......... *H04L 1/0025* (2013.01); *H04L 1/0027* (2013.01); *H04L 29/06* (2013.01); *H04W 72/0466* (2013.01); *H04W 72/0413* (2013.01); *H04W 84/12* (2013.01)

(58) Field of Classification Search
USPC ......................................................... 370/329
See application file for complete search history.

(56) References Cited

U.S. PATENT DOCUMENTS

| | | |
|---|---|---|
| 2011/0002309 A1 | 1/2011 | Park et al. |
| 2011/0103323 A1 | 5/2011 | Wang et al. |
| 2011/0305176 A1 | 12/2011 | Wentink |
| 2012/0213308 A1 | 8/2012 | Merlin et al. |
| 2013/0128807 A1 | 5/2013 | Vermani et al. |
| 2013/0229996 A1 | 9/2013 | Wang et al. |
| 2013/0250904 A1 | 9/2013 | Kang et al. |
| 2013/0294397 A1 | 11/2013 | Lee et al. |
| 2013/0301569 A1 | 11/2013 | Wang et al. |
| 2014/0071873 A1 | 3/2014 | Wang et al. |
| 2014/0133408 A1 | 5/2014 | Wentink |
| 2014/0233478 A1 | 8/2014 | Wentink et al. |
| 2015/0358067 A1 | 12/2015 | Zhang et al. |
| 2016/0080115 A1 | 3/2016 | Josiam et al. |
| 2016/0088602 A1 | 3/2016 | Seok |
| 2016/0330788 A1 | 11/2016 | Zheng et al. |
| 2017/0134975 A1 | 5/2017 | Huang et al. |

FOREIGN PATENT DOCUMENTS

| | | |
|---|---|---|
| WO | WO 2005/117385 A1 | 12/2005 |
| WO | WO 2011/159831 A1 | 12/2011 |
| WO | WO 2013/169212 A1 | 11/2013 |
| WO | WO 2013/170136 A1 | 11/2013 |

OTHER PUBLICATIONS

Asterjadhi et al., "ACK Indication and EIFS," IEEE 11-13/0512r0, IEEE, dated May 13, 2013, slides 1-15.

Asterjadhi et al., "Ack Policy for Short MAC Header", IEEE 11-13/0899r0, IEEE, dated Jul. 13, 2013, slides 1-6.

Liu et al, "Early Ack Indication," IEEE 802.11-12/ 0119r0, IEEE, dated Jan. 16, 2012, slides 1-7.

\* cited by examiner

FIG. 7

| Protocol Version | Type | Subtype | To DS | From DS | More Fragments | Retry | Power Management | More Data | Protected Frame | Order |
|---|---|---|---|---|---|---|---|---|---|---|
| B0 B1 | B2 B3 | B4 B7 | B8 | B9 | B10 | B11 | B12 | B13 | B14 | B15 |
| 2 | 2 | 4 | 1 | 1 | 1 | 1 | 1 | 1 | 1 | 1 |

Bits:

FIG. 15

| Frame Control | Duration | RA | TA | Feedback Segment Retransmission Bitmap | FCS |
|---|---|---|---|---|---|
| 2 | 2 | 6 | 6 | 1 | 4 |

Octets:

FIG. 26

| L-STF | L-LTF | L-SIG | HE-SIG A | HE-STF | HE-LTF | HE-SIG B | Data |
|---|---|---|---|---|---|---|---|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

FIG. 27

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

FIG. 28

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

FIG. 35

| VHT | Rsv | MRQ | MSI/STBC | MFSI/GID-L | MFB | GID-H | Coding type | FB Tx type | Unsolicited MFB | AC constraint | RDG/More PPDU |
|---|---|---|---|---|---|---|---|---|---|---|---|
| 1 | 1 | 1 | 3 | 3 | 15 | 3 | 1 | 1 | 1 | 1 | 1 |

Bits:

3510 → Rsv

DATA TRANSMISSION METHOD IN WIRELESS COMMUNICATION SYSTEM AND DEVICE THEREFOR

CROSS-REFERENCE TO RELATED APPLICATIONS

This application is a Continuation of U.S. patent application Ser. No. 15/516,325 filed on Mar. 31, 2017, which was filed as the National Phase of PCT International Application No. PCT/KR2015/010379 filed on Oct. 1, 2015, which claims priority under 35 U.S.C. 119(e) to U.S. Provisional Application No. 62/058,112 filed on Oct. 1, 2014, U.S. Provisional Application No. 62/186,334 filed on Jun. 29, 2015 and U.S. Provisional Application No. 62/194,303 filed on Jul. 20, 2015, all of which are hereby expressly incorporated by reference into the present application.

BACKGROUND OF THE INVENTION

The present invention relates to wireless communication systems, and more particularly, to a method for transmitting data for supporting a data transmission of multi-user and a device for supporting the same.

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.1 lax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.1 lax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

SUMMARY OF THE INVENTION

An object of the present invention is to propose an uplink/downlink multi-user data transmission and reception method in a wireless communication system.

Another object of the present invention is to propose a high efficiency (HE) format of a PPDU used in uplink/downlink multi-user transmission/reception in a wireless communication system. In particular, the format of the HE-SIG(signal) A field and HE-SIG B field included in the PPDU is proposed.

The technical objects of the present invention are not limited to those objects described above; other technical objects not mentioned above may be clearly understood from what are described below by those skilled in the art to which the present invention belongs.

According to an aspect of the present invention, there is provided an access point (AP) device of a WLAN system and a data transmission method of an AP device.

A downlink (DL) multi-user (MU) transmission method of an AP device in a wireless local area network (WLAN) system may include: generating a DL MU physical protocol data unit (PPDU) including a physical preamble and a data field, the data field including at least one MAC protocol data unit (MPDU), the at least one MPDU including a MAC header and a MAC frame body, and the MAC header including ACK indication information for uplink (UL) MU transmission of an ACK frame as a response to data transmitted through the data field; and transmitting the DL MU PPDU.

The at least one MPDU may include an indicator indicating that the at least one MPDU includes the ACK indication information.

The indicator may be included in an MPDU delimiter field included in the at least one MPDU.

When a type or a sub-type of the at least one MPDU is defined, the indicator may be included in a frame control field of the MAC header, as the defined type or sub-type.

When the at least one MPDU is a control wrapper frame in a high-throughput (HT) format, the indicator may be included in an HT control field included in the MAC header.

When the at least one MPDU is a high-efficiency (HE) format frame, the indicator may be included in an HE control field included in the MAC header.

When a specific reserved bit value of an MPDU delimiter field corresponding to the at least one MPDU is set to a preset value or when a specific reserved bit value of a control field included in the at least one MPDU is set to a preset value, the at least one MPDU may be the HE format frame.

The indicator may be included in a frame control field or an address field included in the MAC header.

When the indicator is included in the frame control field, bit values of a To DS field and From DS field of the frame control field may each be set to 1.

The ACK indication information may be included in a control field of the MAC header.

The control field may include at least one of frequency resource allocation information, bandwidth information, space resource allocation information, transmission channel information, modulation and coding scheme (MCS) level information, maximum length information of a UL MU PPDU carrying the ACK frame, buffer status report request information, and channel status report request information, as the AK indication information, for UL MU transmission of the ACK frame.

When the data field includes an A-MPDU, a portion of the A-MPDU may include the at least one MPDU.

The DL MU transmission method may further include: when the ACK frame is not received as a response in accordance with the ACK indication information, transmitting a block acknowledgement response (BAR) frame to a reception STA of the ACK indication information, receiving a request for transmission of the BAR frame from the reception STA and transmitting the BAR frame to the reception STA in response to the request, or re-transmitting data corresponding to the reception STA to the reception STA through the DL MU PPDU.

The transmitting of a BAR frame to the reception STA of the ACK indication information may be transmitting the BAR frame through channel contention after recognizing that the ACK frame was not received and after a short interframe space (SIFS), or after a backoff procedure for re-transmitting the data to the reception STA.

When a request for transmission of the BAR frame is received from the reception STA and the BAR frame is transmitted to the reception STA in response to the request, the request for the BAR frame may be received from the reception STA during a random access interval.

When the data field includes an A-MPDU, the A-MPDU may include the at least one MPDU.

According to another aspect of the present invention, there is provided an access point (AP) device in a wireless local area network (WLAN) system, including: a radio frequency (RF) unit configured to transmit and receive a wireless signal; and a processor configured to control the RF unit, wherein the processor is further configured to generate a downlink (DL) multi-user (MU) physical protocol data unit (PPDU) including a physical preamble and a data field and transmits the DL MU PPDU, wherein the data field includes at least one MAC protocol data unit (MPDU), the at least one MPDU includes a MAC header and a MAC frame body, and the MAC header includes ACK indication information for uplink (UL) MU transmission of an ACK frame as a response to data transmitted through the data field, and transmits the DL MU PPDU.

The at least one MPDU may include an indicator indicating that the at least one MPDU includes the ACK indication information.

According to an embodiment of the present invention, the AP device may DL MU-transmit a MAC header including ACK indication information indicating a UL MU resource for transmitting an ACK frame, and a reception STA may transmit an ACK frame using a UL MU resource indicated by the received ACK indication information.

Also, according to an embodiment of the present invention, since the AP device may DL MU-transmit an indicator indicating whether the ACK indication information is included, together with the ACK indication information, the reception STA may recognize whether the ACK indication information is included through the indicator.

Other advantages and effects of the present invention will be further described in the following embodiments.

BRIEF DESCRIPTION OF THE DRAWINGS

FIG. 7 is a diagram illustrating the frame control field in the MAC frame in a wireless communication system to which the present invention may be applied;

FIG. 15 is a diagram illustrating a Beamforming Report Poll frame format in a wireless communication system to which the present invention may be applied;

FIGS. 26 to 28 are diagrams illustrating a HE format PPDU according to an embodiment of the present invention.

FIG. 35 is a diagram illustrating a control field of an HT format.

DETAILED DESCRIPTION OF THE INVENTION

Figure 1:
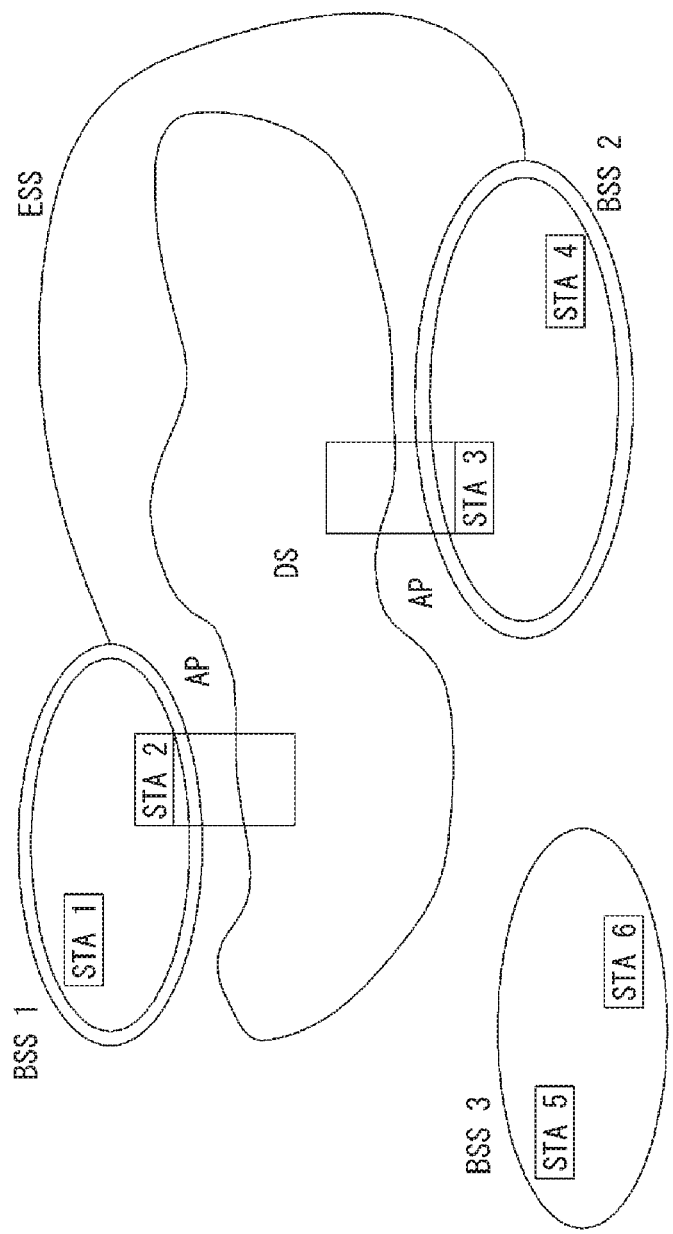
FIG. 1 is a diagram showing an example of an IEEE 802.11 system to which the present invention may be applied.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form.

It should be noted that specific terms disclosed in the present invention are proposed for convenience of description and better understanding of the present invention, and the use of these specific terms may be changed to other formats within the technical scope or spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi). IEEE 802.16 (WiMAX). IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Figure 2:
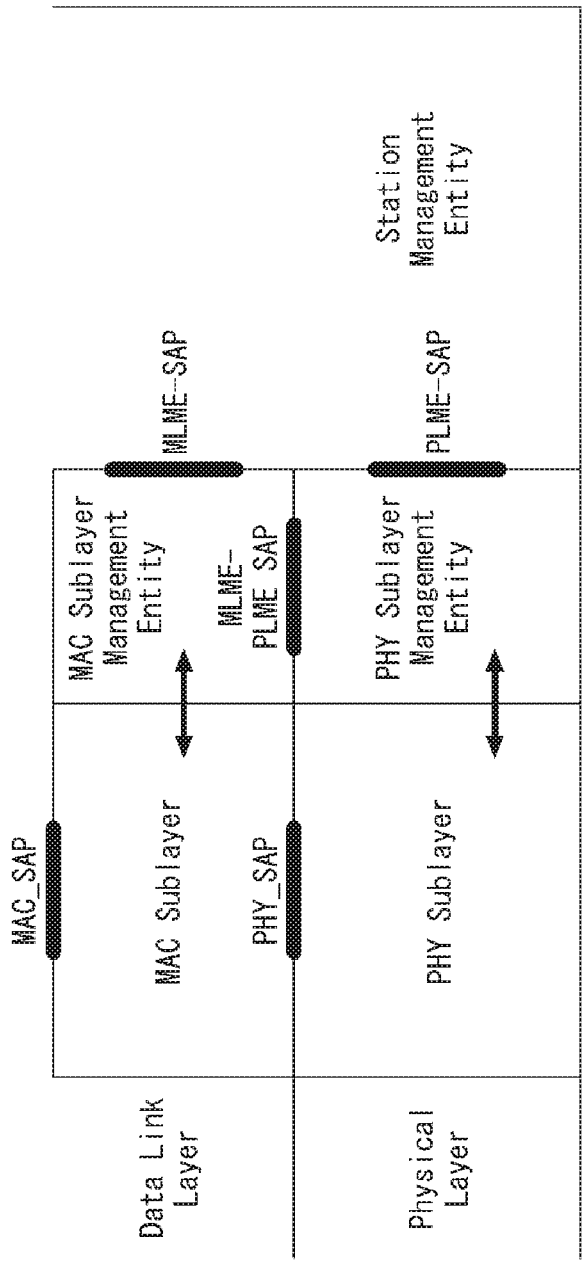
FIG. 2 is a diagram illustrating the structure of a layer architecture of an IEEE 802.11 system to which the present invention may be applied.

FIG. 2 is a diagram illustrating the structure of a layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

Figure 3:
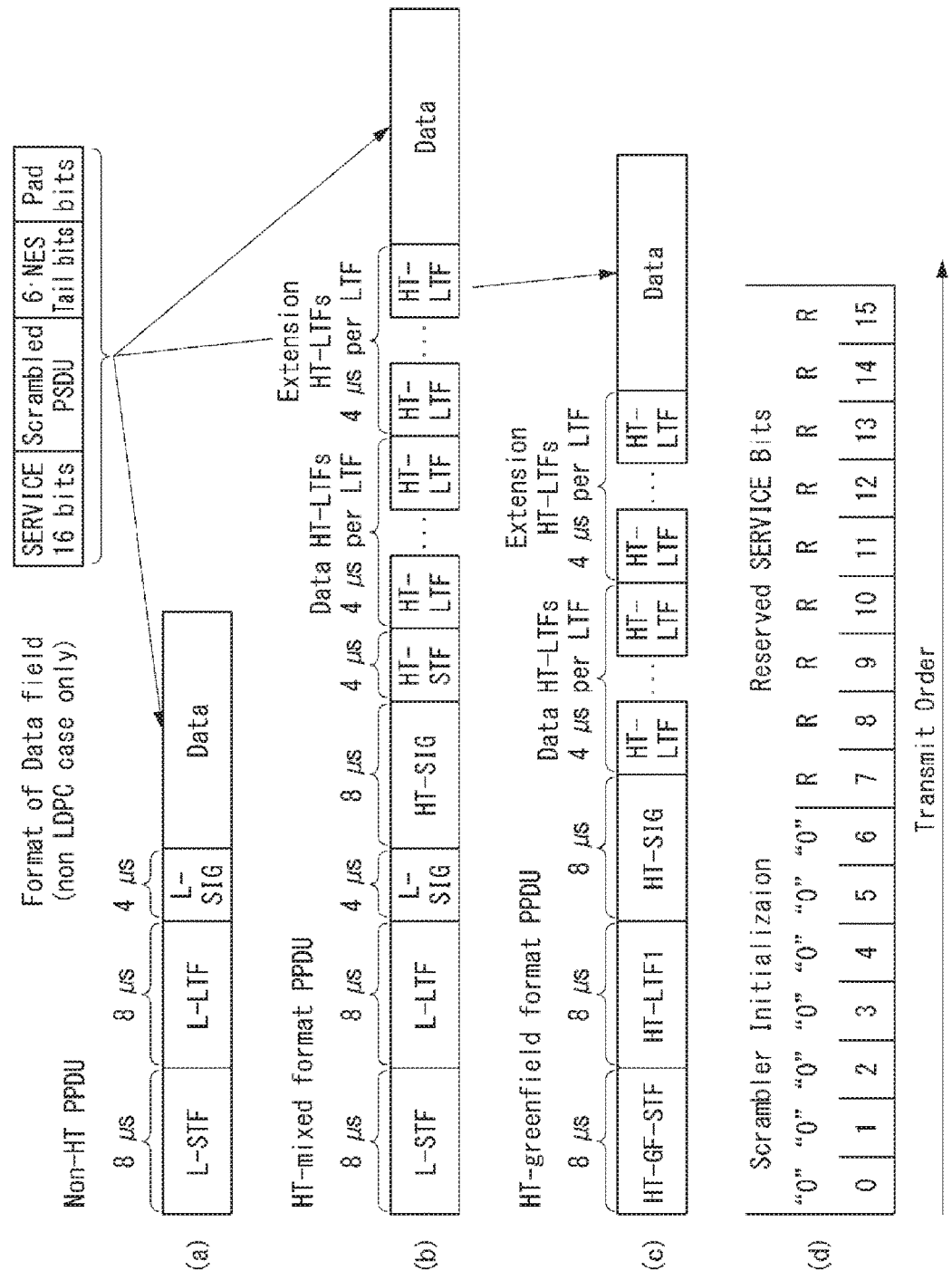
FIG. 3 illustrates a non-HT format PPDU and an HT format PPDU in a wireless communication system to which the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

TABLE 1

| Field | Bit | Description |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

Figure 4:
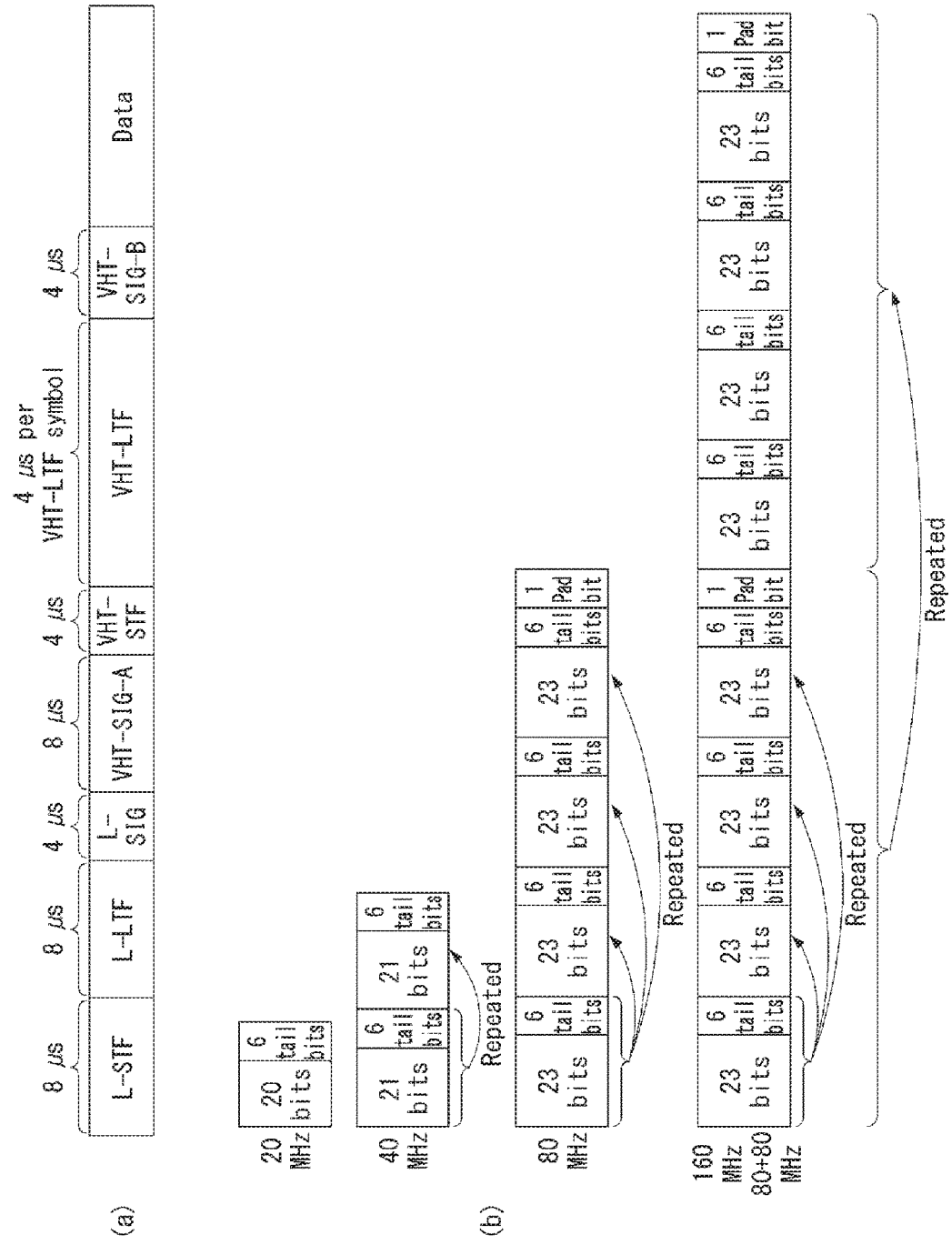
FIG. 4 illustrates a VHT format PPDU in a wireless communication system to which the present invention may be applied.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| field | bit | description |
| --- | --- | --- |
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |

TABLE 2-continued

| field | bit | description |
| --- | --- | --- |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| field | bit | description |
| --- | --- | --- |
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first. VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

Figure 5:
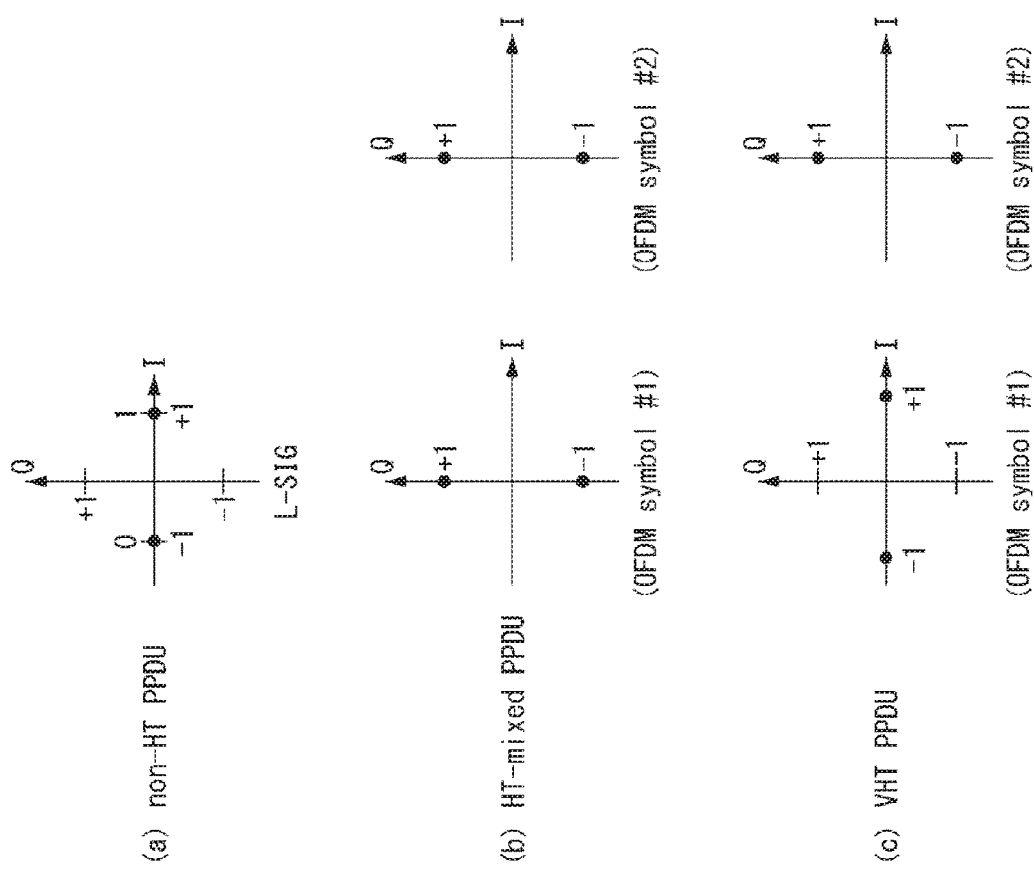
FIG. 5 illustrates constellation diagrams for classifying a PPDU format in a wireless communication system to which the present invention may be applied.

FIG. 5 illustrates constellation diagrams for classifying a PPDU format in a wireless communication system to which the present invention may be applied.

(a) of FIG. 5 illustrates a constellation for the L-SIG field included in the non-HT format PPDU. (b) of FIG. 5 illustrates a phase rotation for HT-mixed format PPDU detection, and (c) of FIG. 5 illustrates a phase rotation for VHT format PPDU detection.

In order for an STA to classify a PPDU as a non-HT format PPDU, HT-GF format PPDU, HT-mixed format PPDU, or VHT format PPDU, the phases of constellations of the L-SIG field and of the OFDM symbols, which are transmitted following the L-SIG field, are used. That is, the STA may classify a PDDU format based on the phases of constellations of the L-SIG field of a received PPDU and/or of the OFDM symbols, which are transmitted following the L-SIG field.

Referring to (a) of FIG. 5, the OFDM symbols of the L-SIG field use BPSK (Binary Phase Shift Keying).

To begin with, in order to classify a PPDU as an HT-GF format PPDU, the STA, upon detecting a first SIG field from a received PPDU, determines whether this first SIG field is an L-SIG field or not. That is, the STA attempts to perform decoding based on the constellation illustrated in (a) of FIG. 5. If the STA fails in decoding, the corresponding PPDU may be classified as the HT-GF format PPDU.

Next, in order to distinguish the non-HT format PPDU, HT-mixed format PPDU, and VHT format PPDU, the phases of constellations of the OFDM symbols transmitted following the L-SIG field may be used. That is, the method of modulation of the OFDM symbols transmitted following the L-SIG field may vary, and the STA may classify a PPDU format based on the method of modulation of fields coming after the L-SIG field of the received PPDU.

Referring to (b) of FIG. 5, in order to classify a PPDU as an HT-mixed format PPDU, the phases of two OFDM symbols transmitted following the L-SIG field in the HT-mixed format PPDU may be used.

More specifically, both the phases of OFDM symbols #1 and #2 corresponding to the HT-SIG field, which is transmitted following the L-SIG field, in the HT-mixed format PPDU are rotated counterclockwise by 90 degrees. That is, the OFDM symbols #1 and #2 are modulated by QBPSK (Quadrature Binary Phase Shift Keying). The QBPSK constellation may be a constellation which is rotated counterclockwise by 90 degrees based on the BPSK constellation.

An STA attempts to decode the first and second OFDM symbols corresponding to the HT-SIG field transmitted after the L-SIG field of the received PDU, based on the constellations illustrated in (b) of FIG. 5. If the STA succeeds in decoding, the corresponding PPDU may be classified as an HT format PPDU.

Next, in order to distinguish the non-HT format PPDU and the VHT format PPDU, the phases of constellations of the OFDM symbols transmitted following the L-SIG field may be used.

Referring to (c) of FIG. 5, in order to classify a PPDU as a VHT format PPDU, the phases of two OFDM symbols transmitted after the L-SIG field may be used in the VHT format PPDU.

More specifically, the phase of the OFDM symbol #1 corresponding to the VHT-SIG-A coming after the L-SIG field in the HT format PPDU is not rotated, but the phase of the OFDM symbol #2 is rotated counterclockwise by 90 degrees. That is, the OFDM symbol #1 is modulated by BPSK, and the OFDM symbol #2 is modulated by QBPSK.

The STA attempts to decode the first and second OFDM symbols corresponding to the VHT-SIG field transmitted following the L-SIG field of the received PDU, based on the constellations illustrated in (c) of FIG. 5. If the STA succeeds in decoding, the corresponding PPDU may be classified as a VHT format PPDU.

On the contrary, if the STA fails in decoding, the corresponding PPDU may be classified as a non-HT format PPDU.

MAC Frame Format

Figure 6:
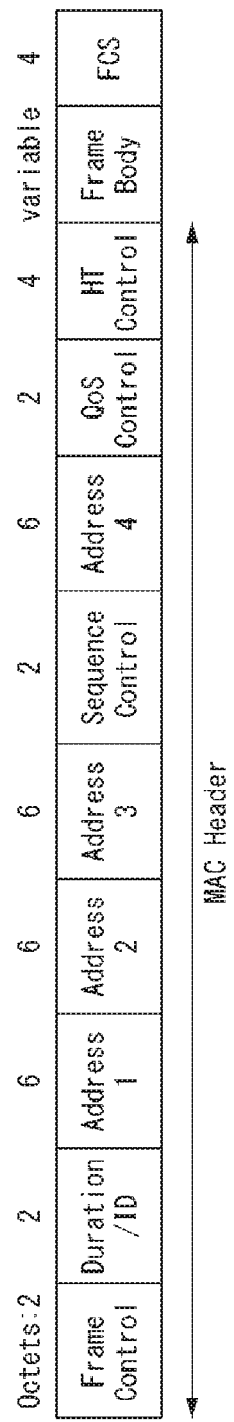
FIG. 6 illustrates a MAC frame format in an IEEE 802.11 system to which the present invention may be applied.

FIG. 6 illustrates a MAC frame format in an IEEE 802.11 system to which the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 is a diagram illustrating the frame control field in the MAC frame in a wireless communication system to which the present invention may be applied.

Referring to FIG. 7, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames. Control frames, and Data frames.

Each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. Also, the above-described fields are examples of the fields that may be included in the MAC frame but not limited to them. That is, the above-described fields may be substituted with other fields or further include additional fields, and not all of the fields may be necessarily included.

Figure 8:
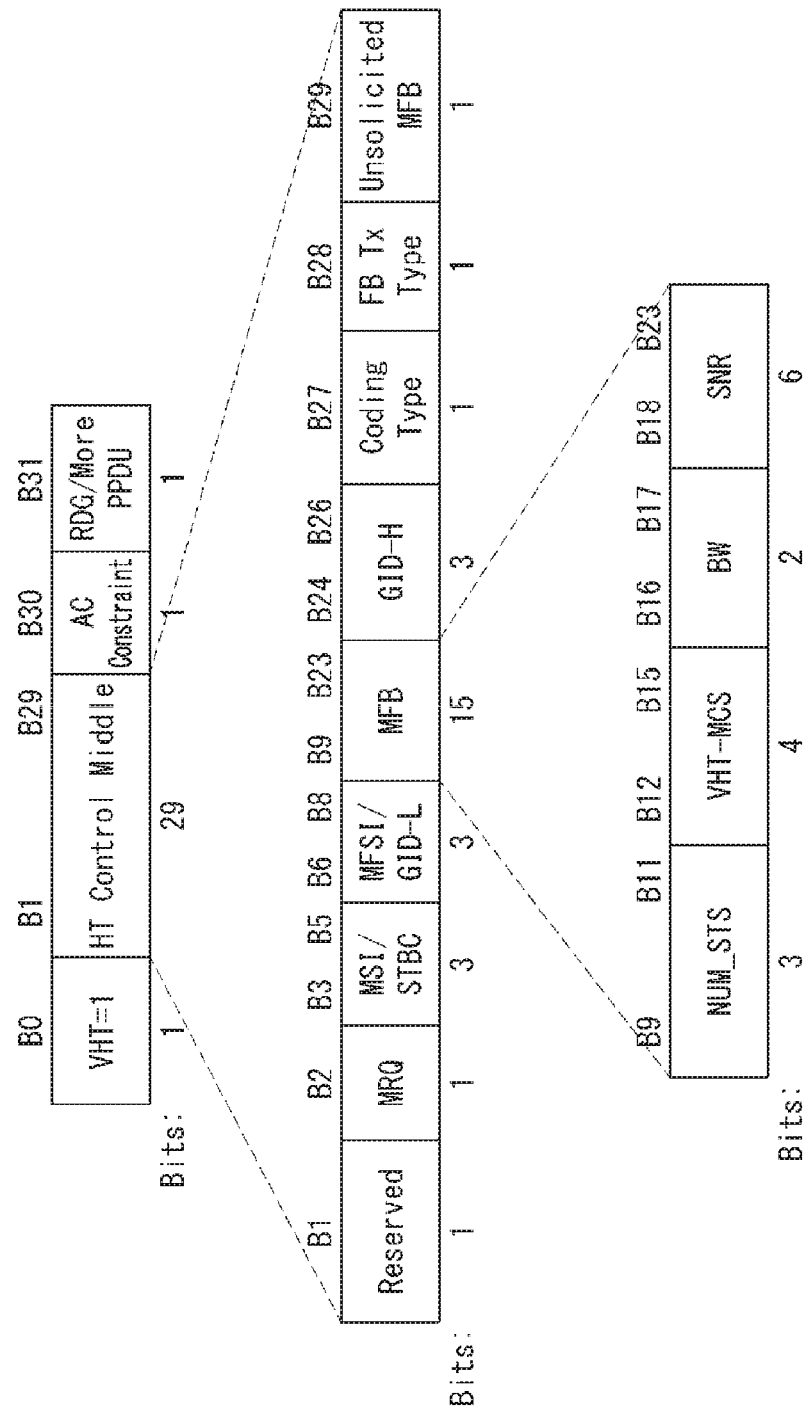
FIG. 8 illustrates the VHT format of an HT control field in a wireless communication system to which the present invention may be applied.

FIG. 8 illustrates the VHT format of an HT control field in a wireless communication system to which an embodiment of the present invention may be applied.

Referring to FIG. 8, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| subfield | meaning | definition |
| --- | --- | --- |
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0"<br>An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB. VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU.<br>All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU.<br>An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ<br>Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present by applying the random backoff period, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

Figure 9:
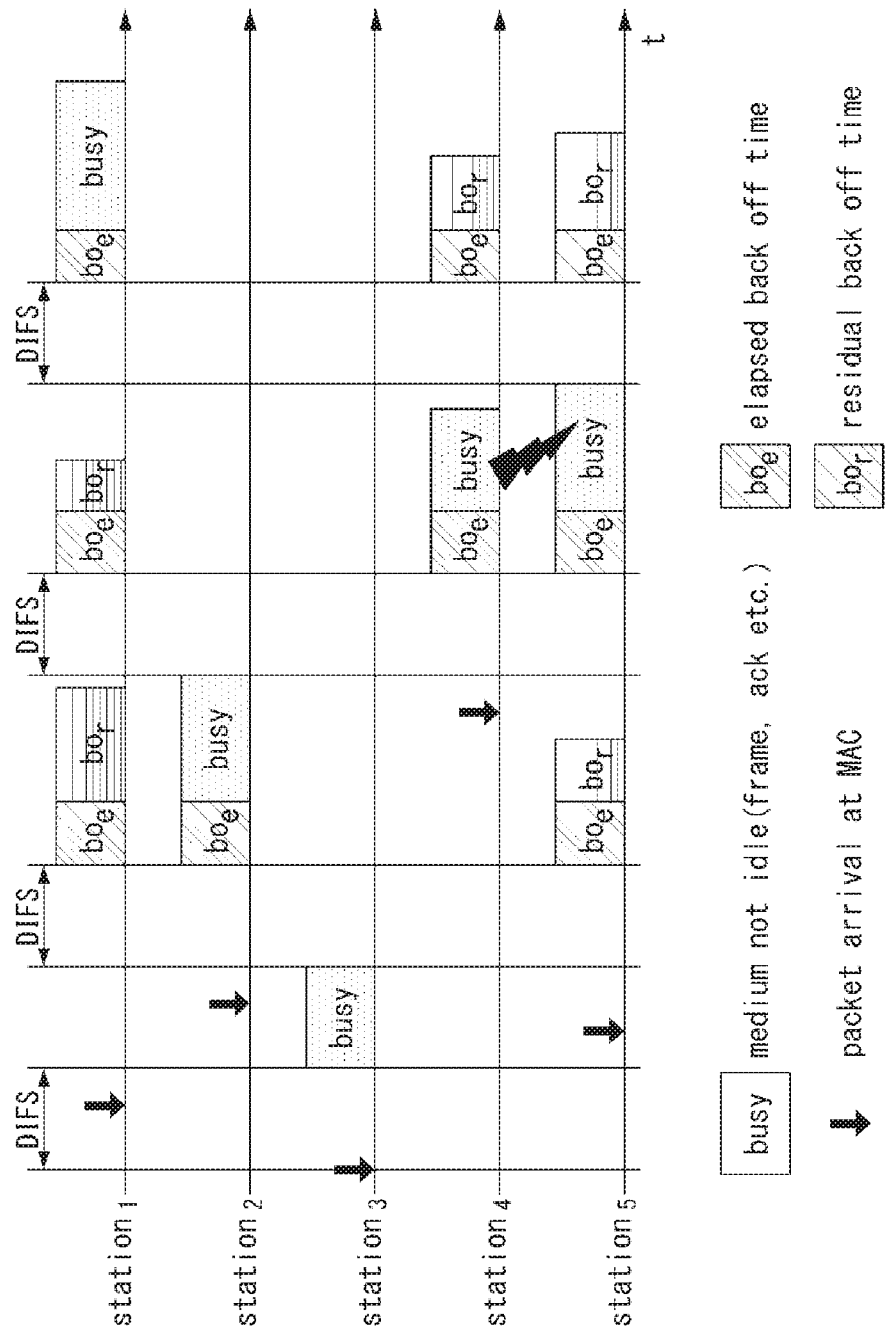
FIG. 9 is a diagram illustrating a random backoff period and a frame transmission procedure in a wireless communication system to which the present invention may be applied.

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful the CW parameter is reset to a CW_min value. The CW, CW_min, and CW_max values may be set to 2^n−1 (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA 2 is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

Figure 10:
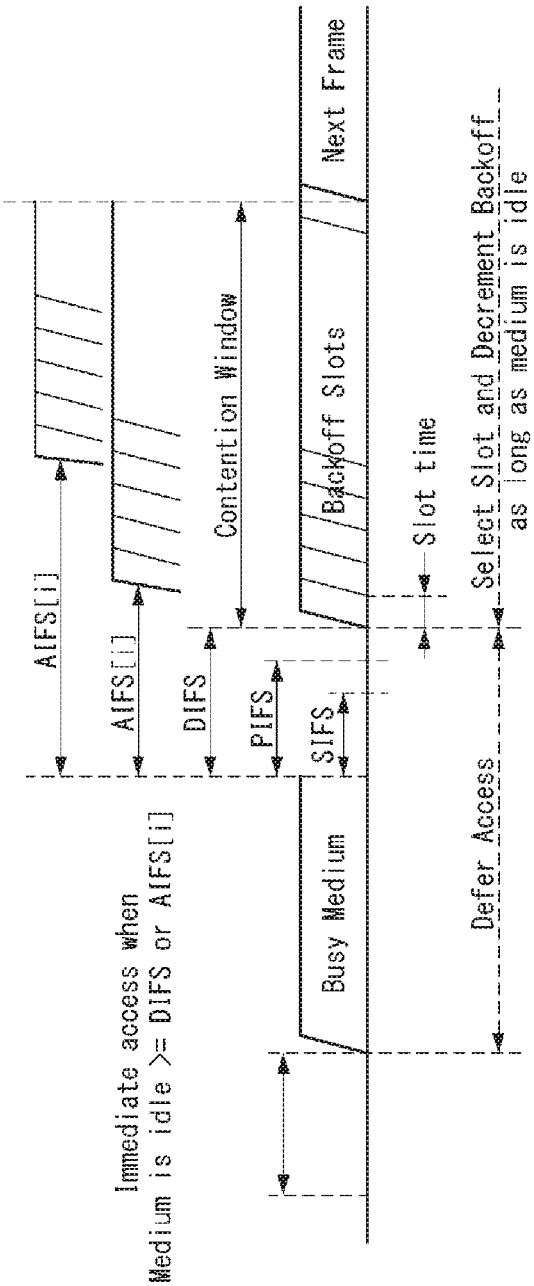
FIG. 10 is a diagram illustrating an IFS relation in a wireless communication system to which the present invention may be applied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)
d) A DCF interframe space (IFS) (DIFS)
e) An arbitration interframe space (IFS) (AIFS)
f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a block ACK request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF

An STA sending a channel switch announcement frame

An STA sending a traffic indication map (TIM) frame

A hybrid coordinator (HC) starting a CFP or transmission opportunity (TXOP)

An HC or non-AP QoS STA, that is, a TXOP holder polled for recovering from the absence of expected reception within a controlled access phase (CAP)

An HT STA using dual CTS protection before sending CTS2

A TXOP holder for continuous transmission after a transmission failure

A reverse direction (RD) initiator for continuous transmission using error recovery An HT AP during a PSMP sequence in which a power save multi-poll (PSMP) recovery frame is transmitted An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$a\text{SIFSTime}(16\ \mu s) = a\text{RxRFDelay}(0.5) + a\text{RxPLCPDelay}(12.5) + a\text{MACProcessingDelay}(1\ \text{or} < 2) + a\text{RxTxTurnaroundTime}(<2) \quad [\text{Equation 1}]$$

$$a\text{RxTxTurnaroundTime} = a\text{TxPLCPDelay}(1) + a\text{RxTxSwitchTime}(0.25) + a\text{TxRampOnTime}(0.25) + a\text{TxRFDelay}(0.5) \quad [\text{Equation 2}]$$

The "aSlotTime" is defined as in Equation 3 below.

$$a\text{SlotTime} = a\text{CCATime}(<4) + a\text{RxTxTurnaroundTime}(<2) + a\text{AirPropagationTime}(<1) + a\text{MACProcessingDelay}(<2) \quad [\text{Equation 3}]$$

In Equation 3, a default physical layer parameter is based on "aMACProcessingDelay" having a value which is equal to or smaller than 1 μs. A radio wave is spread 300 m/μs in the free space. For example, 3 μs may be the upper limit of a BSS maximum one-way distance ~450 m (a round trip is ~900 m).

The PIFS and the SIFS are defined as in Equations 4 and 5, respectively.

$$\text{PIFS}(16\ \mu s) = a\text{SIFSTime} + a\text{SlotTime} \quad [\text{Equation 4}]$$

$$\text{DIFS}(34\ \mu s) = a\text{SIFSTime} + 2 * a\text{SlotTime} \quad [\text{Equation 5}]$$

In Equations 1 to 5, the numerical value within the parenthesis illustrates a common value, but the value may be different for each STA or for the position of each STA.

The aforementioned SIFS. PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$TxSIFS = SIFS - aRxTxTurnaroundTime \quad \text{[Equation 6]}$$

$$TxPIFS = TxSIFS + aSlotTime \quad \text{[Equation 7]}$$

$$TxDIFS = TxSIFS + 2 \cdot aSlotTIme \quad \text{[Equation 8]}$$

Channel State Information Feedback Method

SU-MIMO technology, in which a beamformer assigns all antennas to one beamformee for communication, enhances channel capacity through spatial-temporal diversity gain and multi-stream transmission. SU-MIMO technology uses more antennas than when MIMO technology is not used, thereby leveraging spatial degrees of freedom and contributing to the improvement of a physical layer.

MU-MIMO technology, in which a beamformer assigns antennas to multiple beamformees, can improve the performance of MIMO antennas by increasing the per-beamformee transfer rate or channel reliability through a link layer protocol for multiple access of multiple beamformees connected to the beamformer.

In MIMO environments, performance depends largely on how accurate channel information the beamformer acquires. Thus, a feedback procedure is required to acquire channel information.

There are largely two types of feedback supported to acquire channel information: one is to use a control frame and the other is to use a channel sounding procedure which does not include a data field. Sounding refers to using a preamble training field to measure channel for other purposes than data demodulation of a PPDU including the corresponding training field.

Hereinafter, a channel information feedback method using a control frame and a channel information feedback method using an NDP (null data packet) will be described in more detail.

1) Feedback Using Control Frame

In MIMO environments, a beamformer may instruct a beamformee to send channel state information feedback through the HT control field included in the MAC header, or the beamformee may report channel state information through the HT control field included in the MAC header (see FIG. 8). The HT control field may be included in a Control Wrapper frame, a QoS Data frame in which the Order subfield of the MAC header is set to 1, and a Management frame.

2) Feedback Using Channel Sounding

Figure 11:
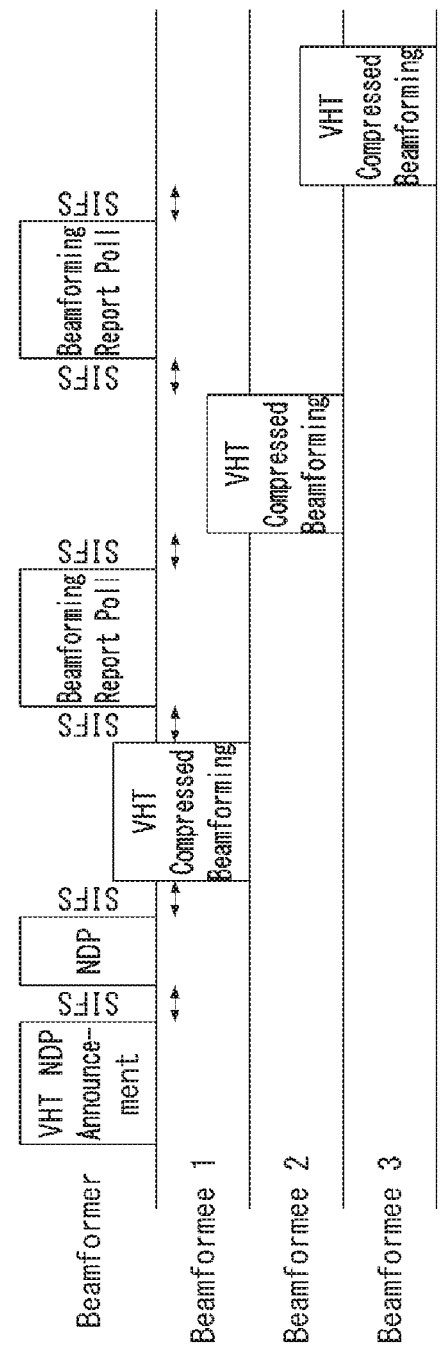
FIG. 11 is a diagram conceptually showing a method of channel sounding in a wireless communication system to which the present invention may be applied.

FIG. 11 is a diagram conceptually showing a method of channel sounding in a wireless communication system to which the present invention may be applied.

FIG. 11 illustrates a method of feedback of channel state information between a beamformer (e.g., AP) and a beamformee (e.g., non-AP STA) based on a sounding protocol. The sounding protocol may refer to a procedure of receiving feedback about information on channel state information.

A method of sounding channel state information between a beamformer and a beamformee based on a sounding protocol may be performed in the following steps:

(1) A beamformer transmits a VHT NDPA (VHT Null Data Packet Announcement) frame indicating sounding and transmission for feedback from a beamformee.

The VHT NDPA frame refers to a control frame that is used to indicate that channel sounding is initiated and an NDP (Null Data Packet) is transmitted. In other words, a VHT NDPA frame may be transmitted before NDP transmission to allow a beamformee to ready to feed back channel state information before receiving the NDP frame.

The VHT NDPA frame may contain AID (association identifier) information, feedback type information, etc. of a beamformee that will transmit an NDP. A more detailed description of the VHT NDPA frame will be given later.

The VHT NDPA frame may be transmitted in different ways for MU-MIMO-based data transmission and SU-MIMO-based data transmission. For example, in the case of channel sounding for MU-MIMO, the VHT NDPA frame may be transmitted in a broadcast manner, whereas, in the case of channel sounding for SU-MIMO, the VHT NDPA frame may be transmitted in a unicast manner.

(2) After transmitting the VHT NDPA frame, the beamformer transmits an NDP after an SIFS. The NDP has a VHT PPDU structure but without a data field.

Beamformees that have received the VHT NDPA frame may check the value of the AID12 subfield included in the STA information field and determine whether they are a target STA for sounding.

Moreover, the beamformees may know their order of feedback through the STA Info field included in the NDPA. FIG. 11 illustrates that feedback occurs in the order of Beamformee 1. Beamformee 2, and Beamformee 3.

(3) Beamformee 1 acquires downlink channel state information based on the training field included in the NDP and generates feedback information to send to the beamformer.

Beamformee 1 transmits a VHT compressed beamforming frame containing feedback information to the beamformer after an SIFS after receiving the NDP frame.

The VHT compressed beamforming frame may include an SNR value for a space-time stream, information on a compressed beamforming feedback matrix for a subcarrier, and so on. A more detailed description of the VHT compressed beamforming frame will be provided later.

(4) The beamformer receives the VHT compressed beamforming frame from Beamformee 1, and then, after an SIFS, transmits a Beamforming Report Poll frame to Beamformec 2 in order to acquire channel information from Beamformee 2.

The Beamforming Report Poll frame is a frame that performs the same role as the NDP frame. Beamformee 2 may measure channel state based on the transmitted Beamforming Report Poll frame.

A more detailed description of the Beamforming Report Poll frame will be given later.

(5) After receiving the Beamforming Report Poll frame, Beamformee 2 transmits a VHT Compressed Beamforming frame containing feedback information to the beamformer after an SIFS.

(6) The beamformer receives the VHT Compressed Beamforming frame from Beamformee 2 and then, after an SIFS, transmits a Beamforming Report Poll frame to Beamformee 3 in order to acquire channel information from Beamformee 3.

(7) After receiving the Beamforming Report Poll frame. Beamformee 3 transmits a VHT Compressed Beamforming frame containing feedback information to the beamformer after an SIFS.

Hereinafter, a frame used for the above-described channel sounding procedure will be discussed.

Figure 12:
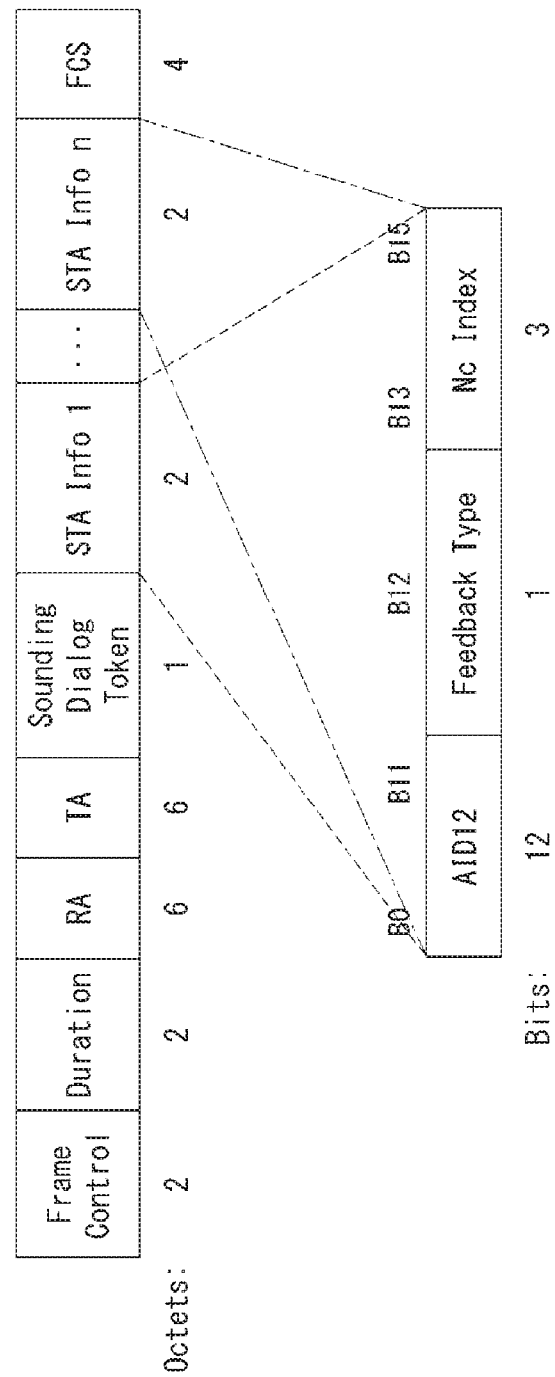
FIG. 12 is a diagram illustrating a VHT NDPA frame in a wireless communication system to which the present invention may be applied.

FIG. 12 is a diagram illustrating a VHT NDPA frame in a wireless communication system to which the present invention may be applied.

Referring to FIG. 12, a VHT NDPA frame may consist of a Frame Control field, a Duration field, an RA (Receiving Address) field, a TA (Transmitting Address) field, a Sounding Dialog Token field, an STA Info 1 field through STA info n field, and an FCS.

The RA field value indicates the address of a receiver or STA which receives the VHT NDPA frame.

If the VHT NDPA frame includes only one STA Info field, then the RA field is set to the address of the STA identified by the AID in the STA Info field. For example, when transmitting the VHT NDPA frame to one target STA for SU-MIMO channel sounding, an AP unicasts the VHT NDPA frame to the target STA.

On the other hand, if the VHT NDPA frame includes more than one STA Info field, then the RA field is set to the broadcast address. For example, when transmitting the VHT NDPA frame to at least one target STA for MU-MIMO channel sounding, an AP broadcasts the VHT NDPA frame.

The TA field value indicates the address of a transmitter or transmitting STA which transmits the VHT NDPA frame or a bandwidth signaling TA.

The Sounding Dialog Token field also may be called a Sounding Sequence field. The Sounding Dialog Token Number subfield in the Sounding Dialog Token field contains a value selected by the beamformer to identify the VHT NDPA frame.

The VHT NDPA frame includes at least one STA Info field. That is, the VHT NDPA frame includes an STA Info field containing information on target STAs for sounding. One STA Info field may be included for each target STA for sounding.

Each STA Info field may include an AID12 subfield, a Feedback Type subfield, and an NC Index subfield.

Table 5 shows the subfields of an STA Info field included in the VHT NDPA frame.

TABLE 5

| Subfield | Description |
| --- | --- |
| AID12 | Contains the AID of a target STA for sounding feedback. The AID12 subfield value is set to '0' if the target STA is an AP, mesh STA, or STA that is a member of an IBSS. |
| Feedback Type | Indicates the type of feedback requested for the target STA for sounding. Set to 0 for SU-MIMO. Set to 1 for MU-MIMO. |
| Nc Index | If the Feedback Type subfield indicates MU-MIMO, then NcIndex indicates the number of columns, Nc, in the Compressed Beamforming Feedback Matrix subfield minus 1. Set to 0 for Nc = 1, Set to 1 for Nc = 2, . . . Set to 7 for Nc = 8. Reserved if the Feedback Type subfield indicates SU-MIMO. |

Information contained in the above-described fields may be as defined in the IEEE 802.11 system. Also, the above-described fields are examples of the fields that may be included in the MAC frame but not limited to them. That is, the above-described fields may be substituted with other fields or further include additional fields.

Figure 13:
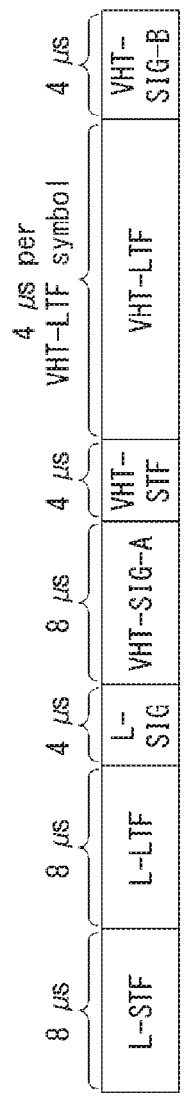
FIG. 13 is a diagram illustrating an NDP PPDU in a wireless communication system to which the present invention may be applied.

FIG. 13 is a diagram illustrating an NDP PPDU in a wireless communication system to which the present invention may be applied.

Referring to FIG. 13, an NDP may have the VHT PPDU format shown previously in FIG. 4, but without the data field. The NDP may be precoded based on a particular precoding matrix and transmitted to a target STA for sounding.

In the L-SIG field of the NDP, the length field indicating the length of a PSDU included in the data field is set to '0'.

In the VHT-SIG-A field of the NDP, the Group ID field indicating whether a transmission technique used for NDP transmission is MU-MIMO or SU-MIMO is set to a value indicating SU-MIMO transmission.

The data bits of the VHT-SIG-B field of the NDP are set to a fixed bit pattern for each bandwidth.

Upon receiving the NDP, the target STA for sounding performs channel estimation and acquires channel state information.

Figure 14:
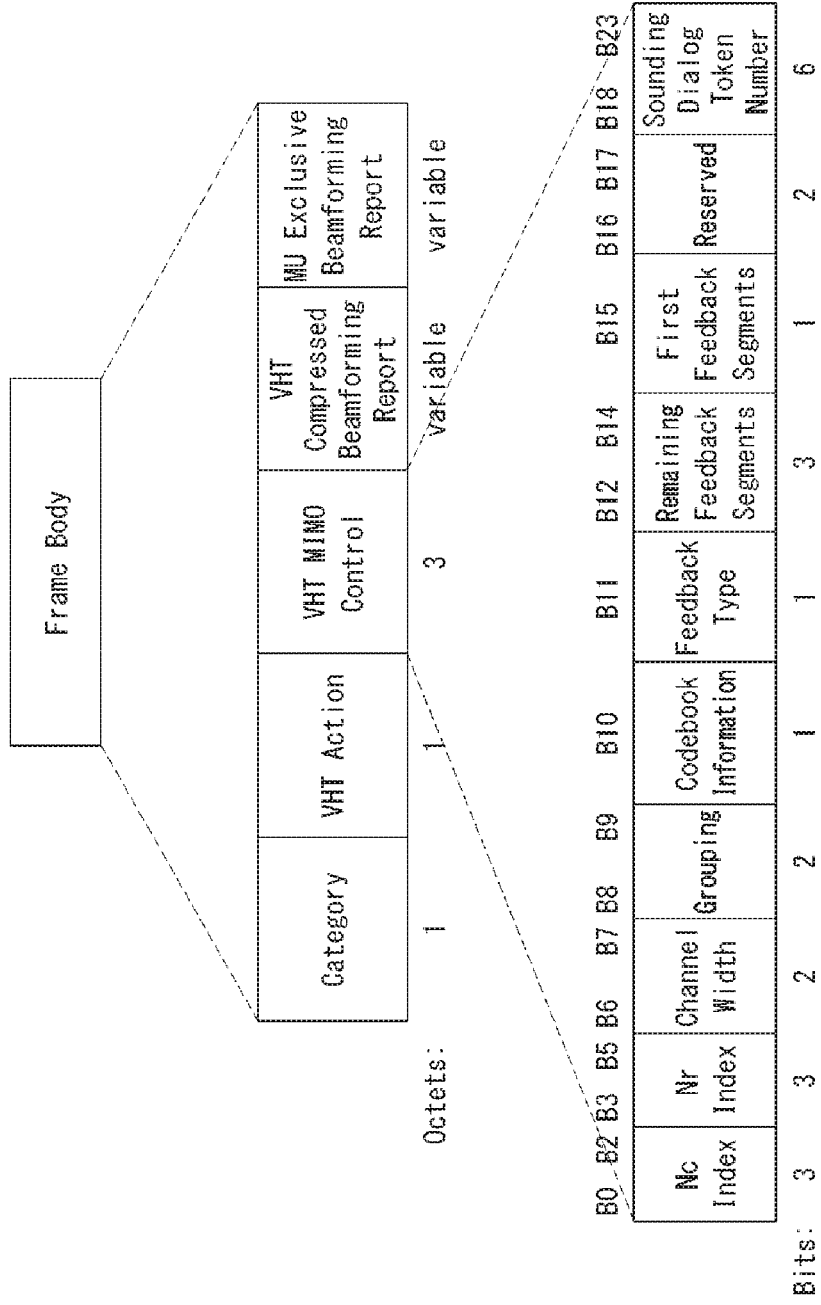
FIG. 14 is a diagram illustrating a VHT compressed beamforming frame format in a wireless communication system to which the present invention may be applied.

FIG. 14 is a diagram illustrating a VHT compressed beamforming frame format in a wireless communication system to which the present invention may be applied.

Referring to FIG. 14, the VHT compressed beamforming frame is a VHT Action frame for supporting VHT functionality, and its frame body includes an Action field. The Action field is included in the frame body of a MAC frame to provide a mechanism for specifying extended management actions.

The Action field consists of a Category field, a VHT Action field, a VHT MIMO Control field, a VHT Compressed Beamforming Report field, and an MU Exclusive Beamforming Report field.

The Category field is set to a value indicating the VHT category (i.e., VHT Action frame), and the VHT Action field is set to a value indicating the VHT Compressed Beamforming frame.

The VHT MIMO Control field is used to feed back control information related to beamforming feedback. The VHT MIMO Control field may always be present in the VHT Compressed Beamforming frame.

The VHT Compressed Beamforming Report field is used to feed back information on a beamforming matrix containing SNR information for space-time streams used for transmitting data.

The MU Exclusive Beamforming Report field is used to feed back SNR information for spatial streams when performing a MU-MIMO transmission.

The presence and content of the VHT Compressed Beamforming Report field and the MU Exclusive Beamforming Report field are dependent on the values of the Feedback Type, Remaining Feedback Segments, and First Feedback Segment subfields of the VHT MIMO Control field Hereinafter, the VHT MIMO Control field, the VHT Compressed Beamforming Report field, and the MU Exclusive Beamforming Report field may be discussed more concretely.

1) The VHT MIMO Control field consists of an Nc index subfield, an Nr Index subfield, a Channel Width subfield, a Grouping subfield, a Codebook Information subfield, a Feedback type subfield, a Remaining Feedback segments subfield, a First Feedback segment subfield, a reserved subfield, and a Sounding Dialog Token Number field.

Table 6 shows the subfields of the VHT MIMO Control field.

TABLE 6

| Subfield | Bits | Description |
| --- | --- | --- |
| Nc Index | 3 | Indicates the number of columns, Nc, in the compressed beamforming feedback matrix minus 1: Set to 0 for Nc = 1, Set to 1 for Nc = 2, . . . Set to 7 for Nc = 8. |

TABLE 6-continued

| Subfield | Bits | Description |
|---|---|---|
| Nr Index | 3 | Indicates the number of rows, Nr, in the compressed beamforming feedback matrix minus 1:<br>Set to 0 for Nr = 1,<br>Set to 1 for Nr = 2,<br>...<br>Set to 7 for Nr = 8. |
| Channel Width | 2 | Indicates the width of the channel measured to create a compressed beamforming feedback matrix:<br>Set to 0 for 20 MHz,<br>Set to 1 for 40 MHz,<br>Set to 2 for 80 MHz,<br>Set to 3 for 160 MHz or 80 + 80 MHz. |
| Grouping | 2 | Indicates the subcarrier grouping, Ng, used for the compressed beamforming feedback matrix:<br>Set to 0 for Ng = 1 (No grouping),<br>Set to 1 for Ng = 2,<br>Set to 2 for Ng = 4,<br>The value 3 is reserved. |
| Codebook Information | 1 | Indicates the size of codebook entries:<br>If Feedback Type is SU:<br>Set to 0 for $b\Psi$ = 2 and $b\Phi$ = 4,<br>Set to 1 for $b\Psi$ = 4 and $b\Phi$ = 6.<br>If Feedback Type is MU:<br>Set to 0 for $b\Psi$ = 5 and $b\Phi$ = 7<br>Set to 1 for $b\Psi$ = 7 and $b\Phi$ = 9.<br>Here, $b\Psi$ and $b\Phi$ indicate the number of quantization bits. |
| Feedback Type | 1 | Indicates the feedback type:<br>Set to 0 for SU-MIMO,<br>Set to 1 for MU-MIMO. |
| Remaining Feedback Segments | 3 | Indicates the number of remaining feedback segments for the associated VHT Compressed Beamforming frame: Set to 0 for the last feedback segment of a segmented report or the only feedback segment of an unsegmented report.<br>Set to a value between 1 and 6 for a feedback segment that is neither the first nor the last of a segmented report.<br>Set to a value between 1 and 6 for a feedback segment that is not the last feedback segment of a segmented report. |
| | | In a retransmitted feedback segment, the field is set to the same value as the associated feedback segment in the original transmission. |
| First Feedback Segment | 1 | Set to 1 for the first feedback segment of a segmented report or the only feedback segment of an unsegmented report;<br>Set to 0 if it is not the first feedback segment or if the VHT Compressed Beamforming Report field and MU Exclusive Beamforming Report field are not present in the frame.<br>In a retransmitted feedback segment, the field is set to the same value as the associated feedback segment in the original transmission. |
| Sounding Dialog Token Number | 6 | Set to the value of the sounding dialog token of the NDPA frame. |

In a VHT Compressed Beamforming frame not carrying all or part of the VHT Compressed Beamforming Report field, the Nc Index subfield, Nr Index subfield. Channel Width subfield. Grouping subfield, Codebook Information subfield, Feedback Type subfield, and Sounding Dialog Token Number field are reserved, the First Feedback Segment field is set to 0, and the Remaining Feedback Segments field is set to 7.

The Sounding Dialog Token Number field also may be called a Sounding Sequence Number subfield.

2) The VHT Compressed Beamforming Report field is used to carry explicit feedback information in the form of angles representing compressed beamforming feedback matrices V for use by a transmit beamformer to determine steering matrices Q.

Table 7 shows the subfields of the VHT Compressed Beamforming Report field.

TABLE 7

| Subfield | Bits | Description |
|---|---|---|
| Average SNR of Space-Time Stream 1 | 8 | Signal-to-noise ratio at the beamformee for space-time stream 1 averaged over all subcarriers |
| ... | ... | ... |
| Average SNR of Space-Time Stream Nc | 8 | Signal-to-noise ratio at the beamformee for space-time stream Nc averaged over all subcarriers |
| Compressed Beamforming Feedback Matrix V for subcarrier k = scidx(0) | Na × ($b\Psi$ + $b\Phi$)/2 | Order of angles in the Compressed Beamforming feedback matrix for the corresponding subcarrier |
| Compressed Beamforming Feedback Matrix V for subcarrier k = scidx(1) | Na × ($b\Psi$ + $b\Phi$)/2 | Order of angles in the Compressed Beamforming feedback matrix for the corresponding subcarrier |
| ... | ... | ... |
| Compressed Beamforming Feedback Matrix V for subcarrier k = scidx(Ns − 1) | Na × ($b\Psi$ + $b\Phi$)/2 | Order of angles in the Compressed Beamforming feedback matrix for the corresponding subcarrier |

With reference to Table 7, the VHT compressed beamforming report field may include the average SNR of each space-time stream and a Compressed Beamforming Feedback Matrix V for each subcarrier. The Compressed Beamforming Feedback Matrix is a matrix including information about channel state and can be used to calculate a channel matrix (i.e., steering matrix Q) for an MIMO-based transmission method.

scidx( ) refers to subcarriers which transmit the Compressed Beamforming Feedback Matrix subfield. Na is fixed by the NrxNc value (e.g., Φ11, Ψ21, ... for NrxNc=2×1).

Ns refers to the number of subcarriers which transmit a compressed beamforming feedback matrix to the beamformer. A beamformee, by using a grouping method, can reduce the number of subcarriers Ns which transmit the compressed beamforming feedback matrix. For example, the number of beamforming feedback matrices provided as feedback information can be reduced by grouping a plurality of subcarriers into one group and transmitting a compressed beamforming feedback matrix for the corresponding group. Ns may be calculated from the Channel Width and Grouping subfields in the VHT MIMO Control field.

Table 8 illustrates the average SNR of Space-Time Stream subfield.

TABLE 8

| Average SNR of Space-Time i subfield | AvgSNR_i |
|---|---|
| −128 | ≤10 dB |
| −127 | −9.75 dB |
| −126 | −9.5 dB |
| ... | ... |
| +126 | 53.5 dB |
| +127 | ≥53.75 dB |

With reference to Table 8, an average SNR for each stream-space stream is obtained by calculating the average SNR of all subcarriers in the corresponding channel and mapping the calculated average SNR into the range of −128 to +128.

3) The MU Exclusive Beamforming Report field is used to carry explicit feedback information in the form of delta ( ) SNRs. The information in the VHT Compressed Beamforming Report field and the MU Exclusive Beamforming Report field can be used by an MU beamformer to determine steering matrices Q.

Table 9 shows the subfields of the MU Exclusive Beamforming Report field included in a VHT compressed beamforming frame.

TABLE 9

| Subfield | Bits | Description |
|---|---|---|
| Delta SNR for space-time stream 1 for subcarrier k = sscidx(0) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(0) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(1) | 4 | The deviation between the SNR of the corresponding subcarrier and the average SNR of all subcarriers for the corresponding space-time stream. |
| ... | ... | |

TABLE 9-continued

| Subfield | Bits | Description |
|---|---|---|
| Delta SNR for space-time stream Nc for subcarrier k = sscidx(1) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(Ns' − 1) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(Ns' − 1) | 4 | The deviation between the SNR of the corresponding subcarrier and the average SNR of all subcarriers for the corresponding space-time stream. |

With reference to Table 9, the MU Exclusive Beamforming Report field may include an SNR for each space-time stream for each subcarrier.

Each Delta SNR subfield has a value which is in the range −8 dB to 7 dB in 1 dB increments.

scidx( ) refers to subcarrier(s) which transmit the Delta SNR subfield. Ns refers to the number of subcarriers which transmit the Delta SNR subfield to the beamformer.

FIG. 15 is a diagram illustrating a Beamforming Report Poll frame format in a wireless communication system to which the present invention may be applied.

Referring to FIG. 15, the Beamforming Report Poll frame consists of a Frame Control field, a Duration field, an RA (Receiving Address) field, a TA (Transmitting Address) field, a Feedback Segment Retransmission Bitmap field, and an FCS.

The RA field value is the address of the intended recipient.

The TA field value is the address of the STA transmitting the Beamforming Report Poll or a bandwidth signaling TA.

The Feedback Segment Retransmission Bitmap field indicates the requested feedback segments of a VHT Compressed Beamforming report.

If the bit in position n (n=0 for LSB and n=7 for MSB) is 1, then the feedback segment with the Remaining Feedback Segments subfield in the VHT MIMO Control field equal to n is requested. If the bit in position n is 0, then the feedback segment with the Remaining Feedback Segments subfield in the VHT MIMO Control field equal to n is not requested.

Group ID

Since a VHT WLAN system supports MU-MIMO transmission for higher throughput, an AP may transmit a data frame simultaneously to at least one MIMO-paired STA. The AP may transmit data simultaneously to an STA group including at least one STA associated with it. For example, the maximum number of paired STAs may be 4. When the maximum number of spatial streams is 8, up to 4 spatial streams may be allotted to each STA.

In a WLAN system supporting Tunneled Direct Link Setup (TDLS), Direct Link Setup (DLS), or a mesh network, an STA trying to send data may send a PPDU to a plurality of STAs by using the MU-MIMO transmission scheme.

An example in which an AP sends a PPDU to a plurality of STAs according to the MU-MIMO transmission scheme is described below.

An AP transmits a PPDU simultaneously to paired STAs belonging to a transmission target STA group through different spatial streams. As described above, the VHT-SIG-A field of the VHT PPDU format includes Group ID information and space-time stream information. Thus, each STA may determine whether a PPDU is sent to itself. No spatial streams may be assigned to particular STAs in the transmission target STA group and therefore no data will be transmitted.

A Group ID Management frame is used to assign or change a user position corresponding to one or more group IDs. That is, the AP may inform of STAs connected to a particular group ID through the Group ID Management frame before performing a MU-MIMO transmission.

Figure 16:
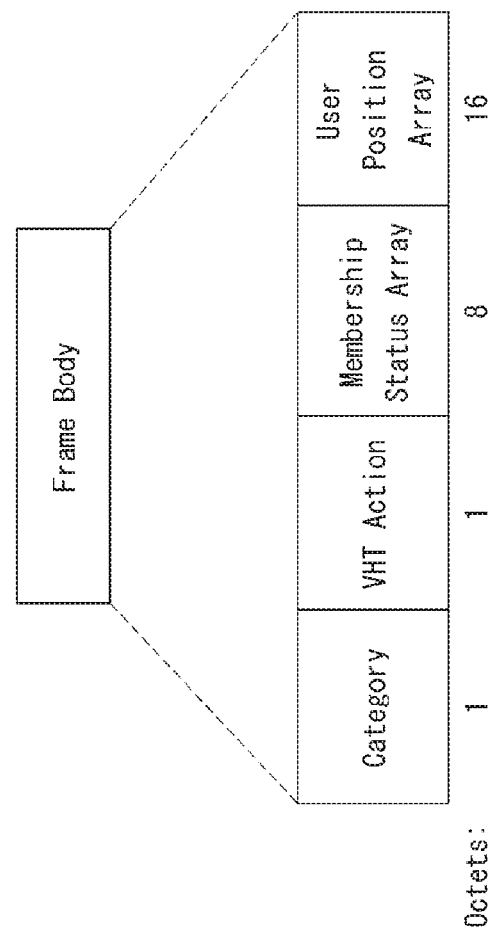
FIG. 16 is a diagram illustrating a Group ID Management frame in a wireless communication system to which the present invention may be applied.

FIG. 16 is a diagram illustrating a Group ID Management frame in a wireless communication system to which the present invention may be applied.

Referring to FIG. 16, the Group ID Management frame is a VHT Action frame for supporting VHT functionality, and its frame body includes an Action field. The Action field is included in the frame body of a MAC frame to provide a mechanism for specifying extended management actions.

The Action field consists of a Category field, a VHT Action field, a VHT MIMO Control field, a Membership Status Array field, and a User Position Array field.

The Category field is set to a value indicating the VHT category (i.e., VHT Action frame), and the VHT Action field is set to a value indicating the Group ID Management frame.

The Membership Status Array field consists of a 1-bit Membership Status subfield for each group. If the Membership Status subfield is set to 0, this indicates that the STA is not a member of the group, and if the Membership Status subfield is set to 1, this indicates that the STA is a member of the group. By setting one or more Membership Status subfields in the Membership Status Array field to 1, one or more groups may be assigned to the STA.

The STA may have a user position in each group to which it belongs.

The User Position Array field consists of a 2-bit User Position subfield for each group. The user position of an STA in a group to which it belongs is indicated by the User Position subfield in the User Position Array field. An AP may assign the same user position to different STAs in each group.

An AP may transmit a Group ID Management frame only if the dot11VHTOptionImplemented parameter is true. The Group ID Management frame shall be sent only to VHT STAs that have the MU Beamformee Capable field in the VHT Capabilities element field set to 1. The Group ID Management frame shall be sent as an individually addressed frame.

An STA receives a Group ID Management frame with an RA field matching its MAC address. The STA updates GROUP_ID_MANAGEMENT, a PHYCONFIG_VECTOR parameter, based on the content of the received Group ID Management frame.

Transmission of a Group ID Management frame to a STA and any associated acknowledgement from the STA shall be complete before the transmission of an MU PPDU to the STA.

An MU PPDU shall be transmitted to a STA based on the content of the Group ID Management frame that is most recently transmitted to the STA and for which an ACK is received.

Downlink (DL) MU-MIMO Frame

Figure 17:
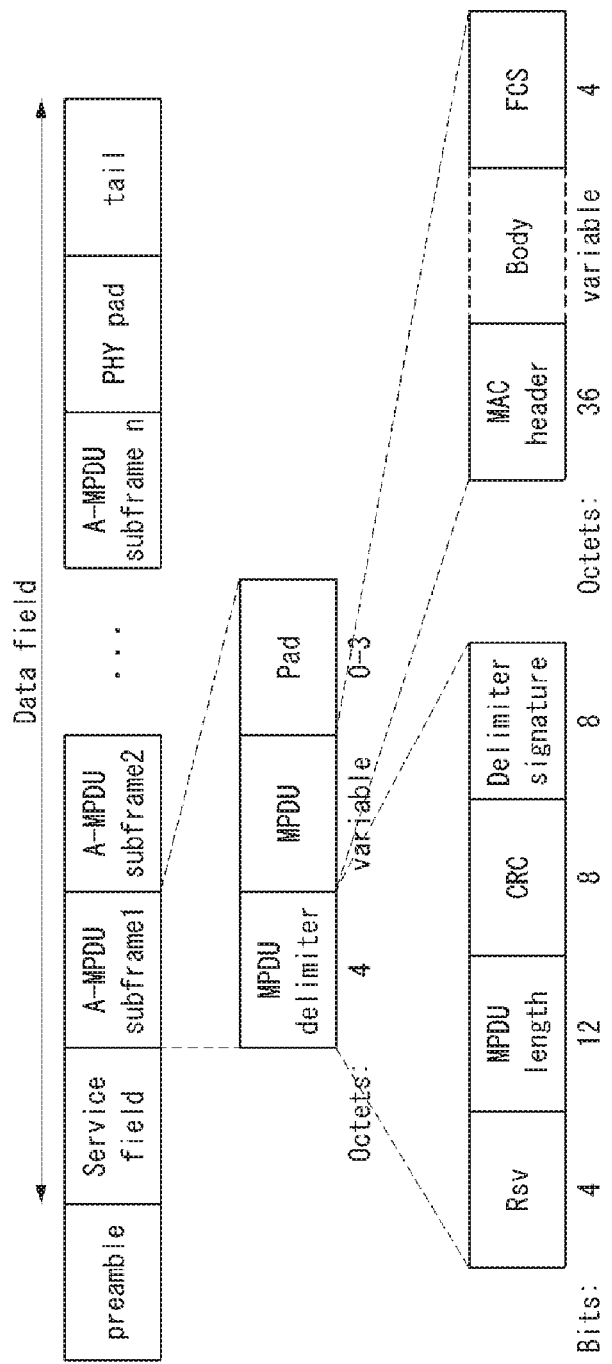
FIG. 17 is a diagram illustrating a downlink multi-user PPDU format in a wireless communication system to which the present invention may be applied.

FIG. 17 is a diagram illustrating a DL multi-user (MU) PPDU format in a wireless communication system to which an embodiment of the present invention may be applied.

Referring to FIG. 17, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

Figure 18:
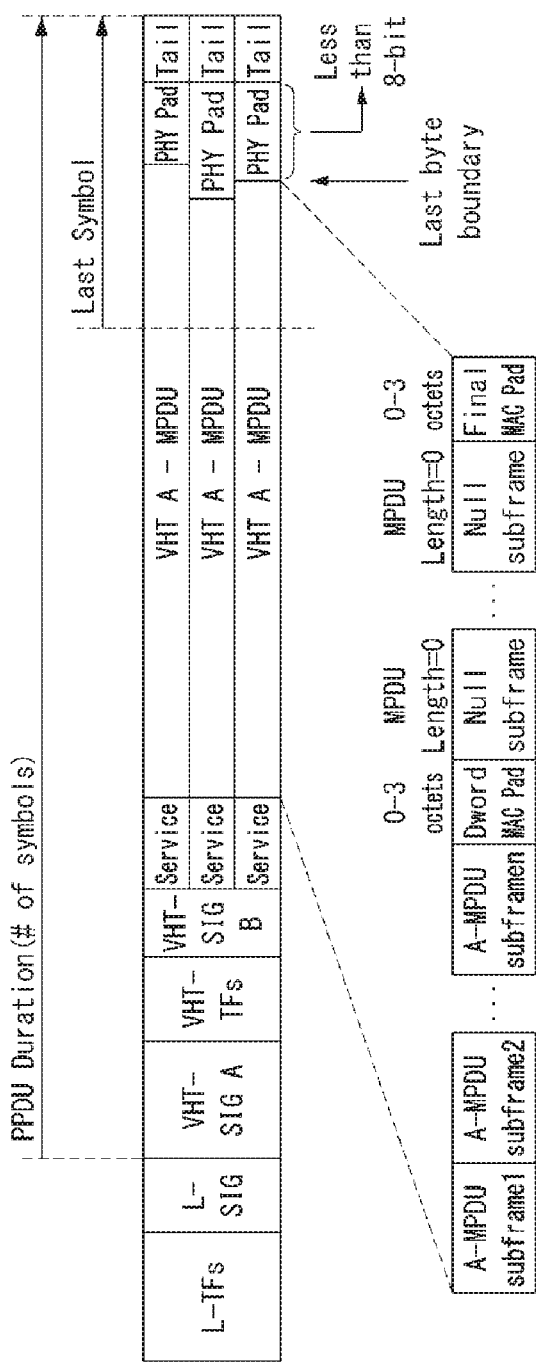
FIG. 18 is a diagram illustrating a downlink multi-user PPDU format in a wireless communication system to which the present invention may be applied.

FIG. 18 is a diagram illustrating a DL multi-user (MU) PPDU format in a wireless communication system to which an embodiment of the present invention may be applied.

In FIG. 18, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 18, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 18, each VHT A-MPDU may be transmitted in a different stream.

In FIG. 18, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block Ack Procedure

Figure 19:
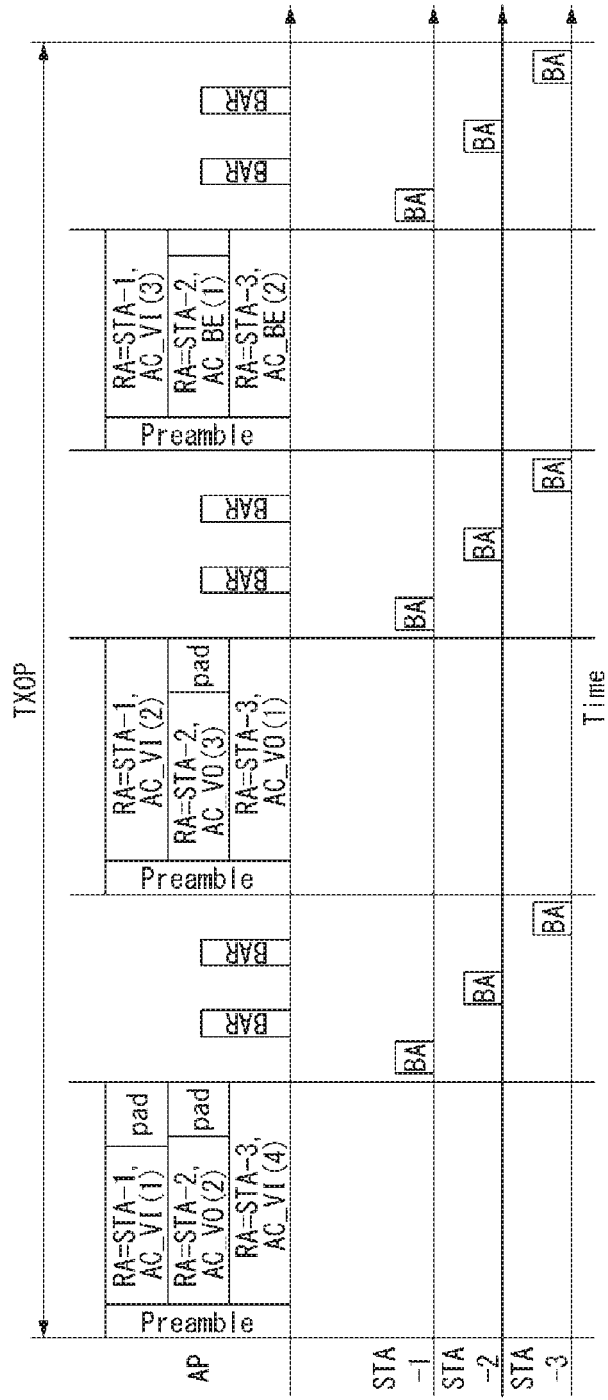
FIG. 19 is a diagram illustrating a downlink MU-MIMO transmission process in a wireless communication system to which the present invention may be applied.

FIG. 19 is a diagram illustrating a downlink MU-MIMO transmission process in a wireless communication system to which the present invention may be applied.

MI-MIMO in 802.11ac works only in the downlink direction from the AP to clients. A multi-user frame can be transmitted to multiple receivers at the same time, but the acknowledgements must be transmitted individually in the uplink direction.

Every MPDU transmitted in a VHT MU PPDU based on 802.11ac is included in an A-MPDU, so responses to A-MPDUs within the VHT MU PPDU that are not immediate responses to the VHT MU PPDU are transmitted in response to BAR (Block Ack Request) frames by the AP.

To begin with, the AP transmits a VHT MU PPDU (i.e., a preamble and data) to every receiver (i.e., STA 1, STA 2, and STA 3). The VHT MU PPDU includes VHT A-MPDUs that are to be transmitted to each STA.

Having received the VHT MU PPDU from the AP, STA 1 transmits a BA (Block Acknowledgement) frame to the AP after an SIFS. A more detailed description of the BA frame will be described later.

Having received the BA from STA 1, the AP transmits a BAR (block acknowledgement request) frame to STA 2 after an SIFS, and STA 2 transmits a BA frame to the AP after an SIFS. Having received the BA frame from STA 2, the AP transmits a BAR frame to STA 3 after an SIFS, and STA 3 transmits a BA frame to the AP after an SIFS.

When this process is performed all STAs, the AP transmits the next MU PPDU to all the STAs.

ACK (Acknowledgement)/Block ACK Frames

In general an ACK frame is used as a response to an MPDU, and a block ACK frame is used as a response to an A-MPDU.

Figure 20:
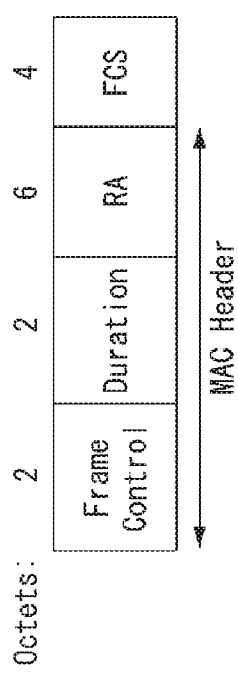
FIG. 20 is a diagram illustrating an ACK frame in a wireless communication system to which the present invention may be applied.

FIG. 20 is a diagram illustrating an ACK frame in a wireless communication system to which the present invention may be applied.

Referring to FIG. 20, the ACK frame consists of a Frame Control field, a Duration field, an RA field, and a FCS.

The RA field is set to the value of the Address 2 field of the immediately preceding Data frame, Management frame, Block Ack Request frame, Block Ack frame, or PS-Poll frame.

For ACK frames sent by non-QoS STAs, if the More Fragments subfield is set to 0 in the Frame Control field of the immediately preceding Data or Management frame, the duration value is set to 0.

For ACK frames not sent by non-QoS STAs, the duration value is set to the value obtained from the Duration/ID field of the immediately preceding Data. Management, PS-PolL BlockAckReq. or BlockAck frame minus the time, in microseconds, required to transmit the ACK frame and its SIFS interval. If the calculated duration includes a fractional microsecond, that value is rounded up to the next higher integer.

Hereinafter, the Block Ack Request frame will be discussed.

Figure 21:
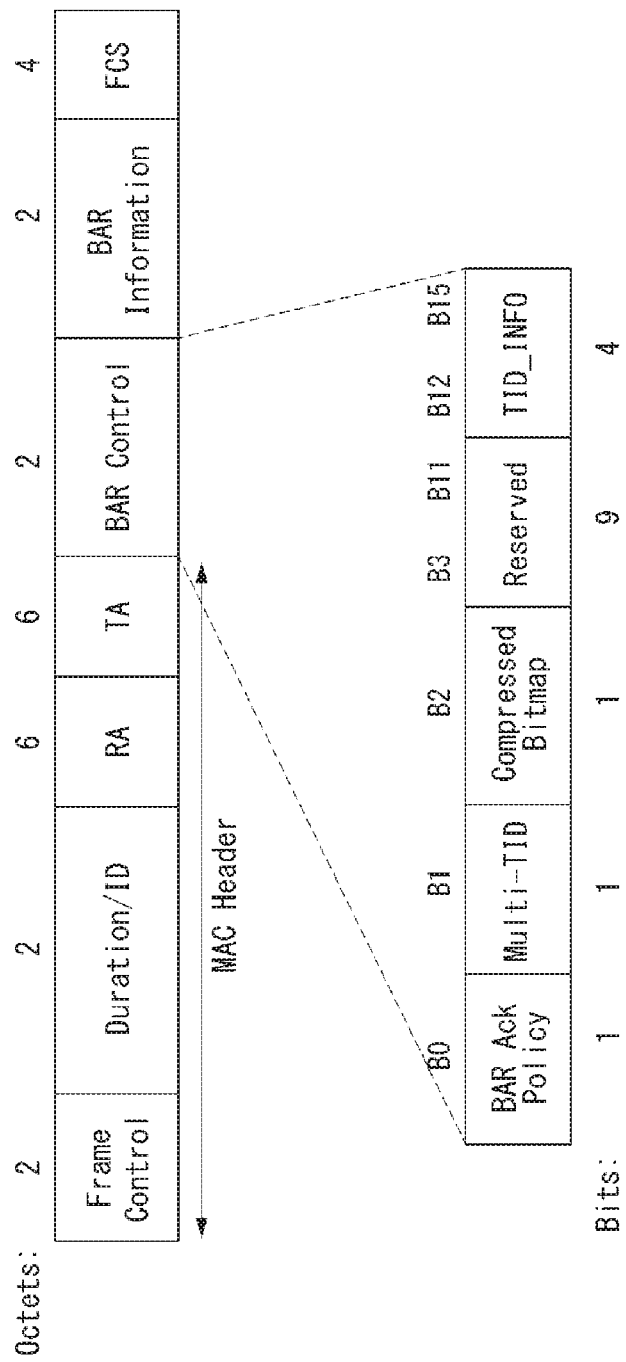
FIG. 21 is a diagram illustrating a Block Ack Request frame in a wireless communication system to which the present invention may be applied.

FIG. 21 is a diagram illustrating a Block Ack Request frame in a wireless communication system to which the present invention may be applied.

Referring to FIG. 21, the Block Ack Request frame consists of a Frame Control field, a Duration/ID field, an RA field, a TA field, a BAR Control field, a BAR Information field, and a frame check sequence (FCS).

The RA field may be set to the address of the STA receiving the BAR frame.

The TA field may be set to the address of the STA transmitting the BAR frame.

The BAR Control field includes a BAR Ack Policy subfield, a Multi-TID subfield, a Compressed Bitmap subfield, a Reserved subfield, and a TID_Info subfield.

Table 10 shows the BAR Control field.

TABLE 10

| Subfield | Bits | Description |
| --- | --- | --- |
| BAR Ack Policy | 1 | Set to 0 when the sender requires immediate ACK of a data transmission. Set to 1 when the sender does not require immediate ACK of a data transmission. |

TABLE 10-continued

| Subfield | Bits | Description |
| --- | --- | --- |
| Multi-TID Compressed Bitmap | 1<br>1 | Indicates the type of the BAR frame depending on the values of the Multi-TID subfield and Compressed Bitmap subfield.<br>00: Basic BAR<br>01: Compressed BAR<br>10: Reserved<br>11: Multi-TID BAR |
| Reserved | 9 | |
| TID_Info | 4 | The meaning of the TID_Info field depends on the type of the BAR frame.<br>For a Basic BAR frame and a Compressed BAR frame, this subfield contains information on TIDs for which a BA frame is required.<br>For a Multi-TID BAR frame, this subfield contains the number of TIDs. |

The BAR Information field contains different information depending on the type of the BAR frame. This will be described with reference to FIG. 22.

Figure 22:
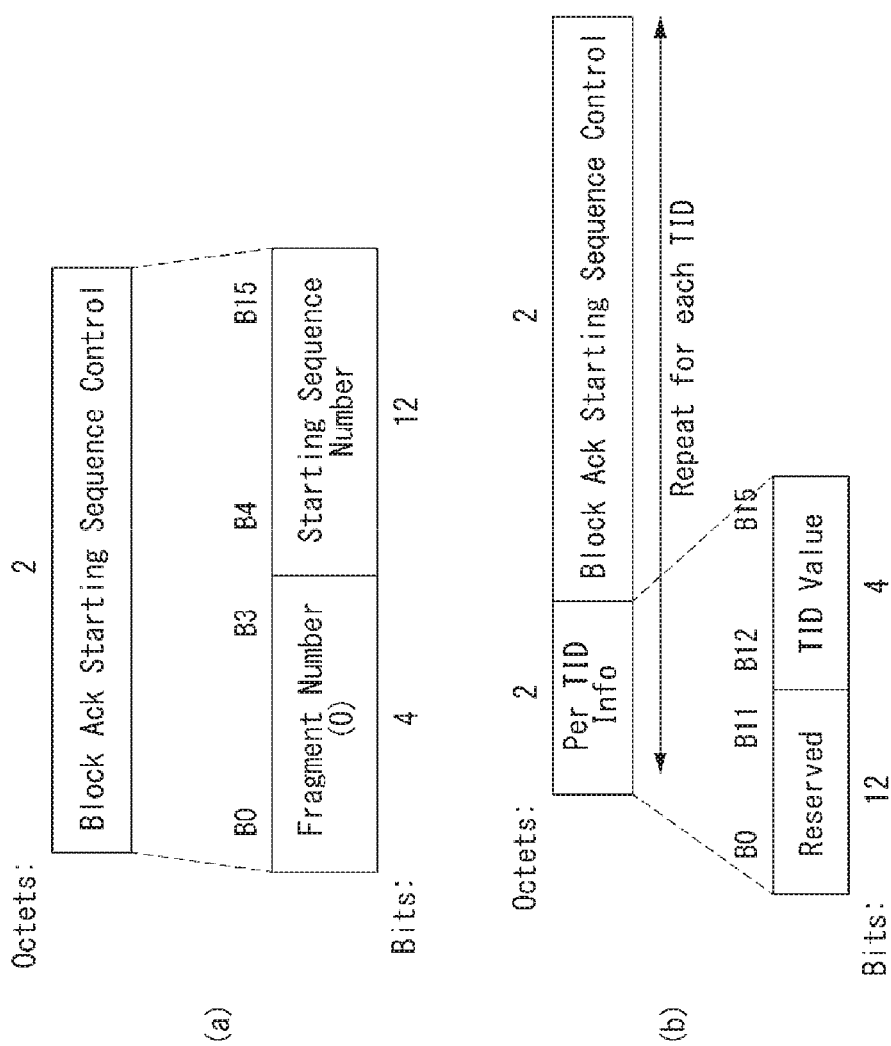
FIG. 22 is a diagram illustrating the BAR Information field of a Block Ack Request frame in a wireless communication system to which the present invention may be applied.

FIG. 22 is a diagram illustrating the BAR Information field of a Block Ack Request frame in a wireless communication system to which the present invention may be applied.

(a) of FIG. 22 illustrates the BAR Information field of Basic BAR and Compressed BAR frames, and (b) of FIG. 22 illustrates the BAR Information field of a Multi-TID BAR frame.

Referring to (a) of FIG. 22, for the Basic BAR and Compressed BAR frames, the BAR Information field includes a Block Ack Starting Sequence Control subfield.

The Block Ack Starting Sequence Control subfield includes a Fragment Number subfield and a Starting Sequence Number subfield.

The Fragment Number subfield is set to 0.

For the Basic BAR frame, the Starting Sequence Number subfield contains the sequence number of the first MSDU for which the corresponding BAR frame is sent. For the Compressed BAR frame, the Starting Sequence Control subfield contains the sequence number of the first MSDU or A-MSDU for which the corresponding BAR frame is sent.

Referring to (b) of FIG. 22, for the Multi-TID BAR frame, the BAR Information field includes a Per TID Info subfield and a Block Ack Starting Sequence Control subfield, which are repeated for each TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BAR frame is sent.

Figure 23:
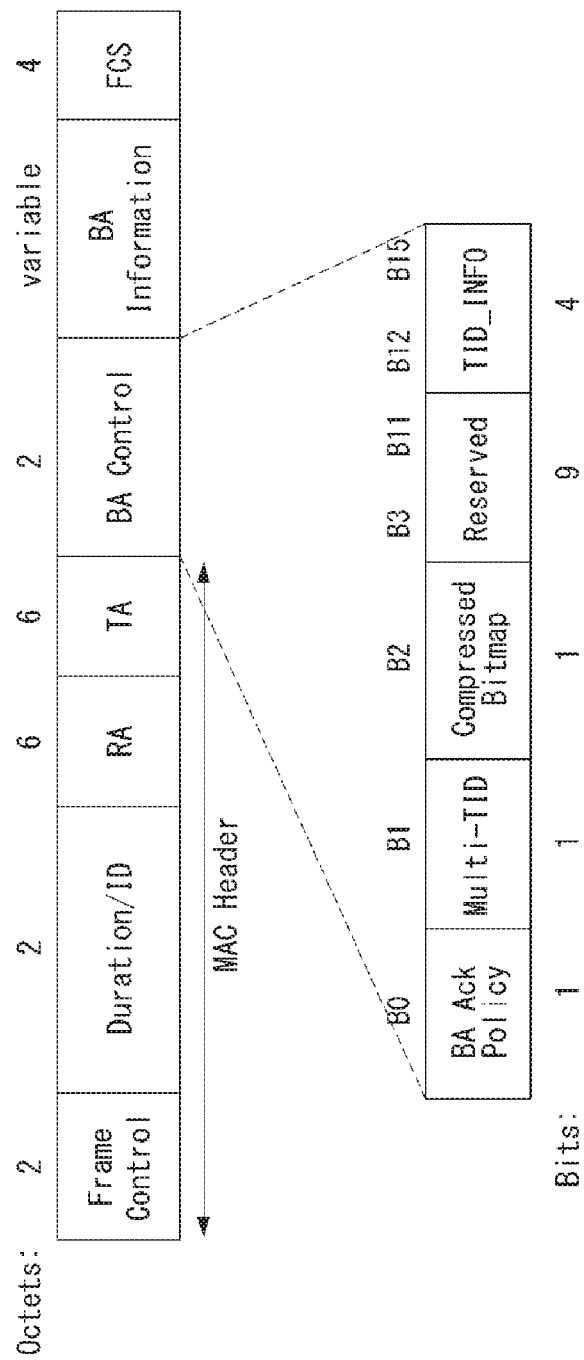
FIG. 23 is a diagram illustrating a Block Ack frame in a wireless communication system to which the present invention may be applied.

FIG. 23 is a diagram illustrating a Block Ack frame in a wireless communication system to which the present invention may be applied.

Referring to FIG. 23, the Block Ack (BA) frame consists of a Frame Control field, a Duration/ID field, an RA field, a TA field, a BA Control field, a BA Information field, and a Frame Check Sequence (FCS).

The RA field may be set to the address of the STA requesting the BA frame.

The TA field may be set to the address of the STA transmitting the BA frame.

The BA Control field includes a BA Ack Policy subfield, a Multi-TID subfield, a Compressed Bitmap subfield, a Reserved subfield, and a TID_Info subfield.

Table 11 shows the BA Control field.

TABLE 11

| Subfield | Bits | Description |
| --- | --- | --- |
| BA Ack Policy | 1 | Set to 0 when the sender requires immediate ACK of a data transmission.<br>Set to 1 when the sender does not require immediate ACK of a data transmission. |
| Multi-TID Compressed Bitmap | 1<br>1 | Indicates the type of the BA frame depending on the values of the Multi-TID subfield and Compressed Bitmap subfield.<br>00: Basic BA<br>01: Compressed BA<br>10: Reserved<br>11: Multi-TID BA |
| Reserved | 9 | |
| TID_Info | 4 | The meaning of the TID_Info field depends on the type of the BA frame.<br>For a Basic BA frame and a Compressed BA frame, this subfield contains information on TIDs for which a BA frame is required.<br>For a Multi-TID BA frame, this subfield contains the number of TIDs. |

The BA Information field contains different information depending on the type of the BA frame. This will be described with reference to FIG. 24.

Figure 24:
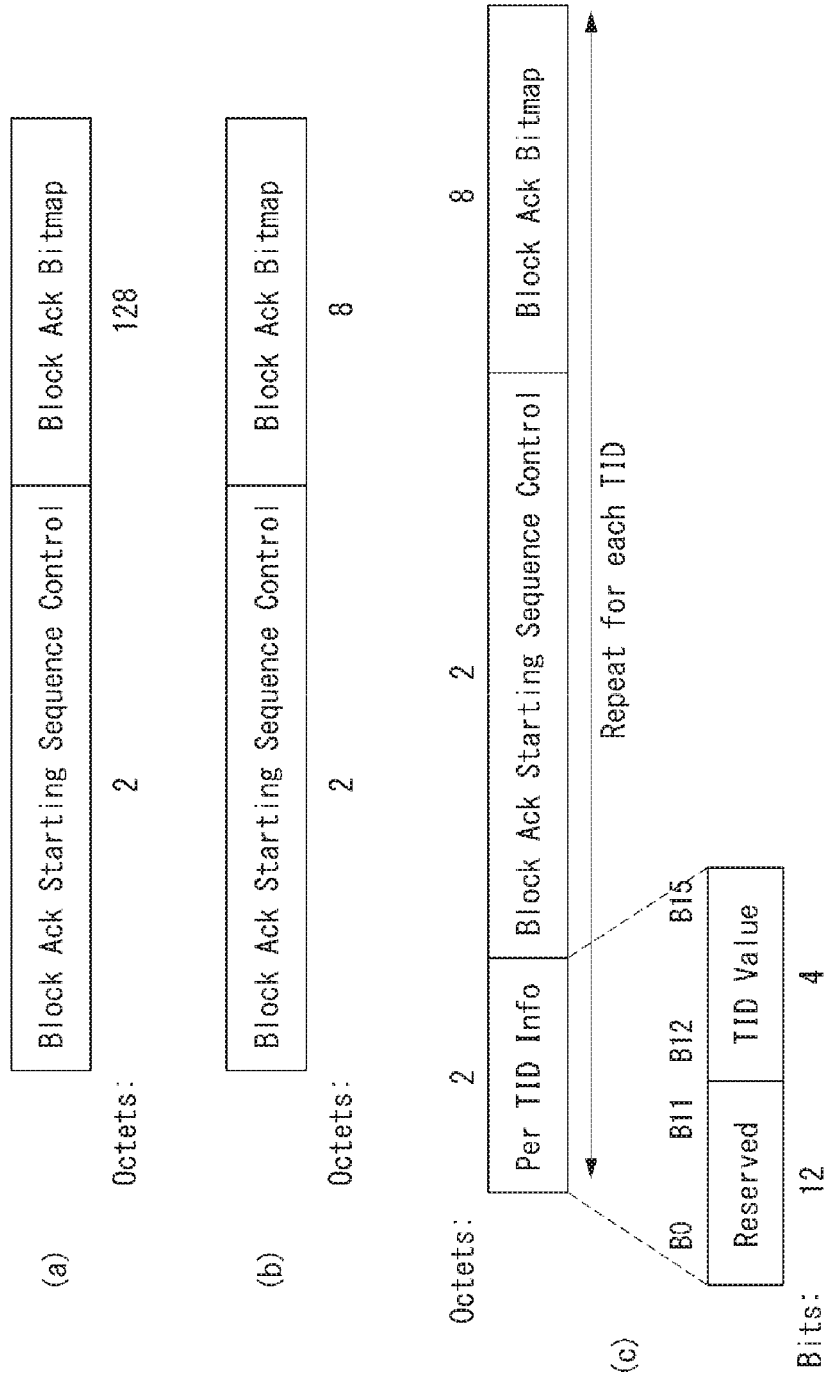
FIG. 24 is a diagram illustrating the BA Information field of a Block Ack frame in a wireless communication system to which the present invention may be applied.

FIG. 24 is a diagram illustrating the BA Information field of a Block Ack frame in a wireless communication system to which the present invention may be applied.

(a) of FIG. 24 illustrates the BA Information field of a Basic BA frame. (b) of FIG. 24 illustrates the BA Information field of a Compressed BAR frame, and (c) of FIG. 24 illustrates the BA Information field of a Multi-TID BA frame.

Referring to (a) of FIG. 24, for the Basic BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU for which the corresponding BA frame is sent, and is set to the same value as the immediately preceding Basic BAR frame.

The Block Ack Bitmap subfield is 128 octets in length and is used to indicate the received status of a maximum of 64 MSDUs. If a bit of the Block Ack Bitmap subfield has a value of '1', it indicates the successful reception of a single MSDU corresponding to that bit position, and if a bit of the Block Ack Bitmap subfield has a value of '0', it indicates the unsuccessful reception of a single MSDU corresponding to that bit position.

Referring to (b) of FIG. 24, for the Compressed BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU or A-MSDU for which the corresponding BA frame is sent, and is set to the same value as the immediately preceding Basic BAR frame.

The Block Ack Bitmap subfield is 8 octets in length and is used to indicate the received status of a maximum of 64 MSDUs and A-MSDU. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

Referring to (c) of FIG. 24, for the Multi-TID BA frame, the BA Information field includes a Per TID Info subfield and a Block Ack Starting Sequence Control subfield, which are repeated for each TID in order of increasing TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BA frame is sent.

The Block Ack Bitmap subfield is 8 octets in length. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

UL Multiple User (MU) Transmission Method

A new frame format and numerology for an 802.1ax system, that is, the next-generation WLAN system are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11 ax WLAN system may also operate in a higher 60 GHz frequency band.

In the IEEE 802.1ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

Figure 25:
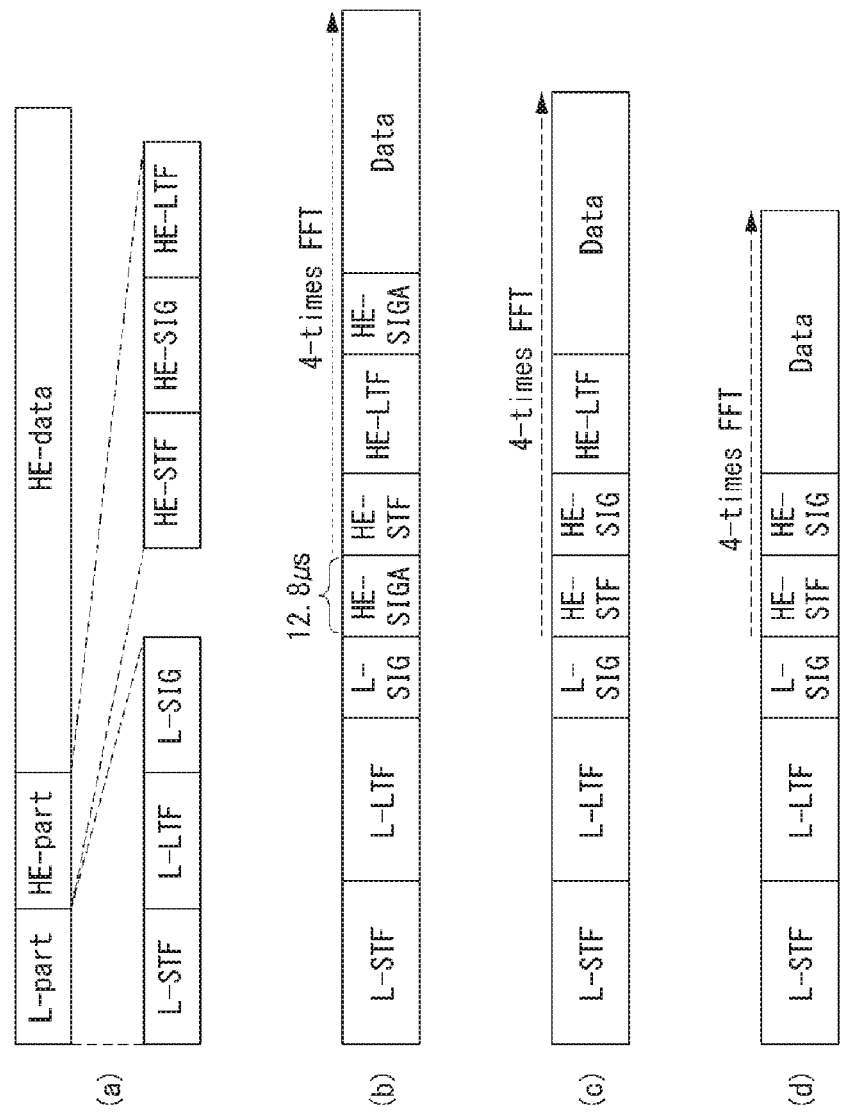
FIG. 25 is a diagram illustrating a high efficiency (HE) format PPDU according to an embodiment of the present invention.

FIG. 25 is a diagram illustrating a high efficiency (HE) format PPDU according to an embodiment of the present invention.

FIG. 25(a) illustrates a schematic configuration of the HE format PPDU, and FIGS. 25(b) to 25(d) illustrate more detailed configurations of the HE format PPDU.

Referring to FIG. 25(a), the HE format PPDU for an HEW may basically include a legacy part (L-part: legacy-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11 ax standard and may include an HE-STF, a HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

Also, the L-part, HE-part (or HE-preamble) may be generally called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.1ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz. 40 MHz. 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subecarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 25 (b), the HE-SIG field may be divided into a HE-SIG-A field and a HE-SIG-B field.

For example, the HE-part of the HE format PPDU may include a HE-SIG-A field having a length of 12.8 μs, an HE-STF of 1 OFDM symbol, one or more HE-LTFs, and a HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz. 40 MHz, 80 MHz, and 160 MHz, respectively.

In this case, if the HE-SIG field is divided into the HE-SIG-A field and the HE-SIG-B field as in FIG. 25(b), the positions of the HE-SIG-A field and the HE-SIG-B field may be different from those of FIG. 25(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 25(c), the HE-SIG field may not be divided into a HE-SIG-A field and a HE-SIG-B field.

For example, the HE-part of the HE format PPDU may include an HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz. 40 MHz, 80 MHz. and 160 MHz, respectively.

Referring to FIG. 25(d), the HE-SIG field is not divided into a HE-SIG-A field and a HE-SIG-B field, and the HE-LTF may be omitted.

For example, the HE-part of the HE format PPDU may include an HE-STF of 1 OFDM symbol and a HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for the WLAN system to which the present invention may be applied may be transmitted through at least one 20 MHz channel. For example, the HE format PPDU may be transmitted in the 40 MHz. 80 MHz or 160 MHz frequency band through total four 20 MHz channel. This will be described in more detail with reference to the drawing below.

FIG. 26 is a diagram illustrating a HE format PPDU according to an embodiment of the present invention.

FIG. 26 illustrates a PPDU format when 80 MHz is allocated to one STA (or OFDMA resource units are allocated to multiple STAs within 80 MHz) or when different streams of 80 MHz are allocated to multiple STAs, respectively.

Referring to FIG. 26, an L-STF, an L-LTF, and an L-SIG may be transmitted an OFDM symbol generated on the basis of 64 FFT points (or 64 subcarriers) in each 20 MHz channel.

Also, the HE-SIG B field may be positioned after the HE-SIG A field. In this case, an FFT size per unit frequency may be further increased after the HE-SFT (or HE-SIG B). For example, from the HE-STF (or HE-SIG-B), 256 FFTs may be used in the 20 MHz channel, 512 FFTs may be used in the 40 MHz channel, and 1024 FFTs may be used in the 80 MHz channel.

A HE-SIG-A field may include common control information commonly received by STAs which receive a PPDU. The HE-SIG-A field may be transmitted in 1 to 3 OFDM symbols. The HE-SIG-A field is duplicated for each 20 MHz and contains the same information. Also, the HE-SIG-A field indicates full bandwidth information of the system.

Table 12 illustrates information contained in the HE-SIG-A field.

TABLE 12

| Field | Bits | Description |
|---|---|---|
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 12 may be as defined in the IEEE 802.11 system. Also, the above-described fields are examples of the fields that may be included in the PPDU but not limited to them. That is, the above-described fields may be substituted with other fields or further include additional fields, and not all of the fields may be necessarily included. Another example of information included in the HE-SIG A field will be described hereinafter in relation to FIG. 34.

The HE-STF field is used to improve AGC estimation in MIMO transmission.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF. L-LTF, and L-SIG fields are transmitted through 64 FFT in a 20 MHz channel so that they can be received by a legacy STA. For example, the L-SIG field may occupy a single OFDM symbol, a single OFDM symbol time may be 4 µs, and a GI may be 0.8 µs.

An FFT size per unit frequency may be further increased from the HE-STF (or from the HE-SIG-A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 27 is a drawing illustrating an HE format PPDU according to an embodiment of the present invention.

In FIG. 27, it is assumed that 20 MHz channels are allocated to different STAs (e.g., STA 1, STA 2. STA 3, and STA 4).

Referring to FIG. 27, an FFT size per unit frequency may be further increased from the HE-SFT (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in a PPDU is the same as the example of FIG. 26, and thus, descriptions thereof will be omitted hereinafter.

The HE-SIG-B may include information specified to each STA but it may be encoded in the entire band (i.e., indicated in the HE-SIG-A field). That is, the HE-SIG-B field includes information regarding every STA and every STA receives the HE-SIG-B field.

The HE-SIG-B field may provide frequency bandwidth information allocated to each STA and/or stream information in a corresponding frequency band. For example, in FIG. 27, as for the HE-SIG-B, STA 1 may be allocated 20 MHz. STA 2 may be allocated a next 20 MHz. STA 3 may be allocated a next 20 MHz, and STA 4 may be allocated a next 20 MHz. Also, the STA 1 and STA 2 may be allocated 40 MHz and STA 3 and STA 4 may be allocated a next 40 MHz. In this case, STA 1 and STA 2 may be allocated different streams and STA 3 and STA 4 may be allocated different streams.

Also, an HE-SIG C field may be defined and added to the example of FIG. 27. Here, information regarding every STA may be transmitted in the entire band in the HE-SIG-B field, and control information specified to each STA may be transmitted by 20 MHz through the HE-SIG-C field.

Also, unlike the examples of FIGS. 26 and 27, the HE-SIG-B field may not be transmitted in the entire band but may be transmitted by 20 MHz, like the HE-SIG-A field. This will be described with reference to FIG. 26.

FIG. 28 is a diagram illustrating an HE format PPDU according to an embodiment of the present invention.

In FIG. 28, it is assumed that 20 MHz channels are allocated to different STAs (e.g., STA 1. STA 2, STA 3, and STA 4).

Referring to FIG. 28, the HE-SIG-B field is not transmitted in the entire band but is transmitted by 20 MHz, like the HE-SIG-A field. Here, however, unlike the HE-SIG-A field, the HE-SIG-B field may be encoded by 20 MHz and transmitted but may not be duplicated by 20 MHz and transmitted.

Here, an FFT size per unit frequency may be further increased from the HE-STF (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in the PPDU is the same as the example of FIG. 26, and thus, descriptions thereof will be omitted.

The HE-SIG-A field is duplicated by 20 MHz and transmitted.

The HE-SIG-B field may provide frequency bandwidth information allocated to each STA and/or stream information in a corresponding frequency band. Since the HE-SIG-B field includes information regarding each STA, information regarding each STA may be included in each HE-SIG-B field in units of 20 MHz. Here, in the example of FIG. 28, 20 MHz is allocated to each STA, but, in a case in which 40 MHz is allocated to an STA, the HE-SIG-B may be duplicated by 20 MHz and transmitted.

In a case where a partial bandwidth having a low level of interference from an adjacent BSS is allocated to an STA in a situation in which each BSS supports different bandwidths, the HE-SIG-B is preferably not transmitted in the entire band as mentioned above.

Hereinafter, the HE format PPDU of FIG. 28 will be described for the purposes of description.

In FIGS. 26 to 28, a data field, as payload, may include a service field, a scrambled PSDU, a tail bit, and a padding bit.

Meanwhile, the HE format PPDU illustrated in FIGS. 26 to 28 may be distinguished through a repeated L-SIG (RL-SIG), a repeated symbol of an L-SIG field. The RL-SIG field is inserted in front of the HE SIG-A field, and each STA may identify a format of a received PPDU using the RL-SIG field, as an HE format PPDU.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DUUL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

Figure 29:
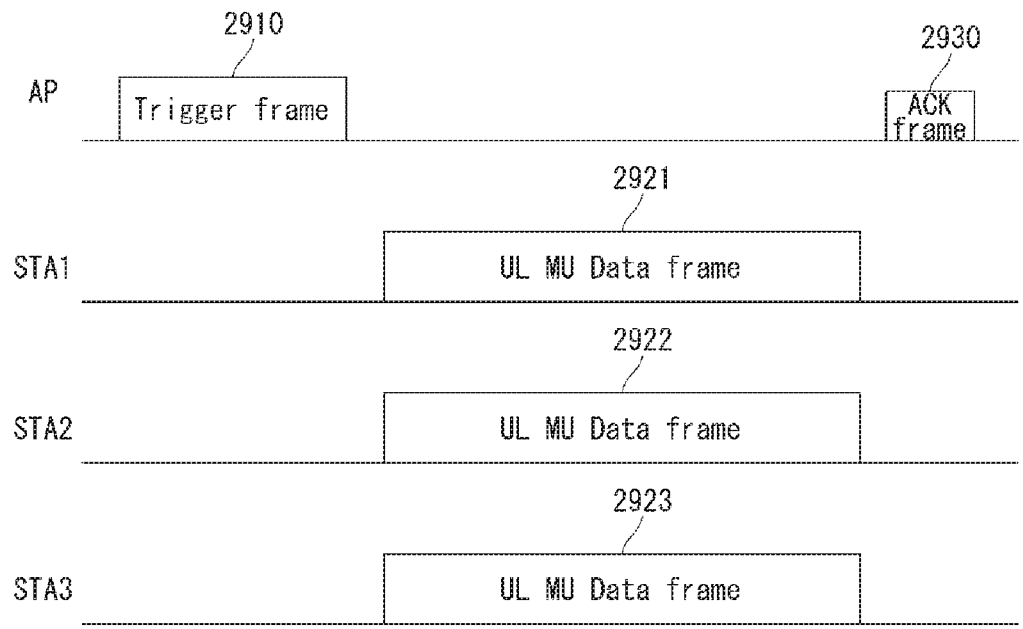
FIG. 29 is a diagram illustrating an uplink multi-user transmission procedure according to an embodiment of the present invention.

FIG. 29 is a diagram illustrating an uplink multi-user transmission procedure according to an embodiment of the present invention.

Referring to FIG. 29, an AP may instruct STAs participating in UL MU transmission to prepare for UL MU transmission, receive an UL MU data frame from these STAs, and send an ACK frame (BA (Block Ack) frame) in response to the UL MU data frame.

First of all, the AP instructs STAs that will transmit UL MU data to prepare for UL MU transmission by sending an UL MU Trigger frame 2910. Here, the term UL MU scheduling frame may be called "UL MU scheduling frame".

Here, the UL MU Trigger frame 2910 may contain control information such as STA ID (identifier)/address information, information on the allocation of resources to be used by each STA, and duration information.

The STA ID/address information refers to information on the identifier or address for specifying an STA that transmits uplink data.

The resource allocation information refers to information on uplink transmission resources allocated to each STA (e.g., information on frequency/subcarriers allocated to each STA in the case of UL MU OFDMA transmission and a stream index allocated to each STA in the case of UL MU MIMO transmission).

The duration information refers to information for determining time resources for transmitting an uplink data frame sent by each of multiple STAs.

For example, the duration information may include period information of a TXOP (Transmit Opportunity) allocated for uplink transmission of each STA or information (e.g., bits or symbols) on the uplink frame length.

Also, the UL MU Trigger frame 2910 may further include control information such as information on an MCS to be used when each STA sends an UL MU data frame, coding information, etc.

The above-mentioned control information may be transmitted in a HE-part (e.g., the HE-SIG-A field or HE-SIG-B field) of a PPDU for delivering the UL MU Trigger frame 2910 or in the control field of the UL MU Trigger frame 2910 (e.g., the Frame Control field of the MAC frame).

The PPDU for delivering the UL MU Trigger frame 2910 starts with an L-part (e.g., the L-STF field, L-LTF field, and L-SIG field). Accordingly, legacy STAs may set their NAV (Network Allocation Vector) by L-SIG protection through the L-SIG field. For example, in the L-SIG, legacy STAs may calculate a period for NAV setting (hereinafter, 'L-SIG protection period') based on the data length and data rate. The legacy STAs may determine that there is no data to be transmitted to themselves during the calculated L-SIG protection period.

For example, the L-SIG protection period may be determined as the sum of the value of the MAC Duration field of the UL MU Trigger frame 2910 and the remaining portion after the L-SIG field of the PPDU delivering the UL MU Trigger frame 2910. Accordingly, the L-SIG protection period may be set to a period of time until the transmission of an ACK frame 2930 (or BA frame) transmitted to each STA, depending on the MAC duration value of the UL MU Trigger frame 2910.

Hereinafter, a method of resource allocation to each STA for UL MU transmission will be described in more detail. A field containing control information will be described separately for convenience of explanation, but the present invention is not limited to this.

A first field may indicate UL MU OFDMA transmission and UL MU MIMO transmission in different ways. For example, '0' may indicate UL MU OFDMA transmission, and '1' may indicate UL MU MIMO transmission. The first field may be 1 bit in size.

A second field (e.g., STA ID/address field) indicates the IDs or addresses of STAs that will participate in UL MU transmission. The size of the second field may be obtained by multiplying the number of bits for indicating an STA ID by the number of STAs participating in UL MU. For example, if the second field has 12 bits, the ID/address of each STA may be indicated in 4 bits.

A third field (e.g., resource allocation field) indicates a resource region allocated to each STA for UL MU transmission. Each STA may be sequentially informed of the resource region allocated to it according to the order in the second field.

If the first field has a value of 0, this indicates frequency information (e.g., frequency index, subcarrier index, etc.) for UL MU transmission in the order of STA IDs/addresses in the second field, and if the first field has a value of 1, this indicates MIMO information (e.g., stream index, etc.) for UL MU transmission in the order of STA IDs/addresses in the second field.

In this case, a single STA may be informed of multiple indices (i.e., frequency/subcarrier indices or stream indices). Thus, the third field may be configured by multiplying the number of bits (or which may be configured in a bitmap format) by the number of STAs participating in UL MU transmission.

For example, it is assumed that the second field is set in the order of STA 1, STA 2, . . . and the third field is set in the order of 2, 2, . . . .

In this case, if the first field is 0, frequency resources may be allocated to STA 1 and STA 2, sequentially in the order of higher frequency region (or lower frequency region). In an example, when 20 MHz OFDMA is supported in an 80 MHz band. STA 1 may use a higher (or lower) 40 MHz band and STA 2 may use the subsequent 40 MHz band.

On the other hand, if the first field is 1, streams may be allocated to STA 1 and STA 2, sequentially in the order of higher-order (or lower-order) streams. In this case, a beamforming scheme for each stream may be prescribed, or the third field or fourth field may contain more specific information on the beamforming scheme for each stream.

Each STA sends a UL MU Data frame 2921, 2922, and 2923 to an AP based on the UL MU Trigger frame 2910. That is, each STA may send a UL MU Data frame 2921, 2922, and 2923 to an AP after receiving the UL MU Trigger frame 2910 from the AP.

Each STA may determine particular frequency resources for UL MU OFDMA transmission or spatial streams for UL MU MIMO transmission, based on the resource allocation information in the UL MU Trigger frame 2910.

Specifically, for UL MU OFDMA transmission, each STA may send an uplink data frame on the same time resource through a different frequency resource.

Here, each of STA 1 to STA 3 may be allocated different frequency resources for uplink data frame transmission, based on the STA ID/address information and resource allocation information included in the UL MU Trigger frame 2910. For example, the STA ID/address information may sequentially indicate STA 1 to STA 3, and the resource allocation information may sequentially indicate frequency resource 1, frequency resource 2, and frequency resource 3. In this case. STA 1 to STA 3 sequentially indicated based on the STA ID/address information may be allocated frequency resource 1, frequency resource 2, and frequency resource 3, which are sequentially indicated based on the resource allocation information. That is, STA 1. STA 2, and STA 3 may send the uplink data frame 2921, 2922, and 2923 to the AP through frequency resource 1, frequency resource 2, and frequency resource 3, respectively.

For UL MU MIMO transmission, each STA may send an uplink data frame on the same time resource through at least one different stream among a plurality of spatial streams.

Here, each of STA 1 to STA 3 may be allocated spatial streams for uplink data frame transmission, based on the STA ID/address information and resource allocation information included in the UL MU Trigger frame 2910. For example, the STA ID/address information may sequentially indicate STA 1 to STA 3, and the resource allocation information may sequentially indicate spatial stream 1, spatial stream 2, and spatial stream 3. In this case, STA 1 to STA 3 sequentially indicated based on the STA ID/address information may be allocated spatial stream 1, spatial stream 2, and spatial stream 3, which are sequentially indicated based on the resource allocation information. That is, STA 1, STA 2, and STA 3 may send the uplink data frame 2921, 2922, and 2923 to the AP through spatial stream 1, spatial stream 2, and spatial stream 3, respectively.

The PPDU for delivering the uplink data frame 2921, 2922, and 2923 may have a new structure, even without an L-part.

For UL MU MIMO transmission or for UL MU OFDMA transmission in a subband below 20 MHz, the L-part of the PPDU for delivering the uplink data frame 2921, 2922, and 2923 may be transmitted on an SFN (that is, all STAs send an L-part having the same configuration and content). On the contrary, for UL MU OFDMA transmission in a subband above 20 MHz, the L-part of the PPDU for delivering the uplink data frame 2921, 2922, and 2923 may be transmitted every 20 MHz.

As long as the information in the UL MU Trigger frame 2910 suffices to construct an uplink data frame, the HE-SIG field (i.e., a part where control information for a data frame configuration scheme is transmitted) in the PPDU delivering the uplink data frame 2921, 2922, and 2923 may not be required. For example, the HE-SIG-A field and/or the HE-SIG-B field may not be transmitted. Also, the HE-SIG-A field and the HE-SIG C field may be transmitted, but the HE-SIG-B field may not be transmitted.

An AP may send an ACK Frame 2930 (or BA frame) in response to the uplink data frame 2921, 2922, and 2923 received from each STA. Here, the AP may receive the uplink data frame 2921, 2922, and 2923 from each STA and then, after an SIFS, transmit the ACK frame 2930 to each STA.

Using the existing ACK frame structure, an RA field having a size of 6 octets may include the AID (or Partial AID) of STAs participating in UL MU transmission.

Alternatively, an ACK frame with a new structure may be configured for DL SU transmission or DL MU transmission.

The AP may send an ACK frame 2930 to an STA only when an UL MU data frame is successfully received by the corresponding STA. Through the ACK frame 2930, the AP may inform whether the reception is successful or not by ACK or NACK. If the ACK frame 2930 contains NACK information, it also may include the reason for NACK or information (e.g., UL MU scheduling information, etc.) for the subsequent procedure.

Alternatively, the PPDU for delivering the ACK frame 2930 may be configured to have a new structure without an L-part.

The ACK frame 2930 may contain STA ID or address information, but the STA ID or address information may be omitted if the order of STAs indicated in the UL MU Trigger frame 2910 also applies to the ACK frame 2930.

Moreover, the TXOP (i.e., L-SIG protection period) of the ACK frame 2930 may be extended, and a frame for the next UL MU scheduling or a control frame containing adjustment information for the next UL MU transmission may be included in the TXOP.

Meanwhile, an adjustment process may be added to synchronize STAs for UL MU transmission.

Figure 30:
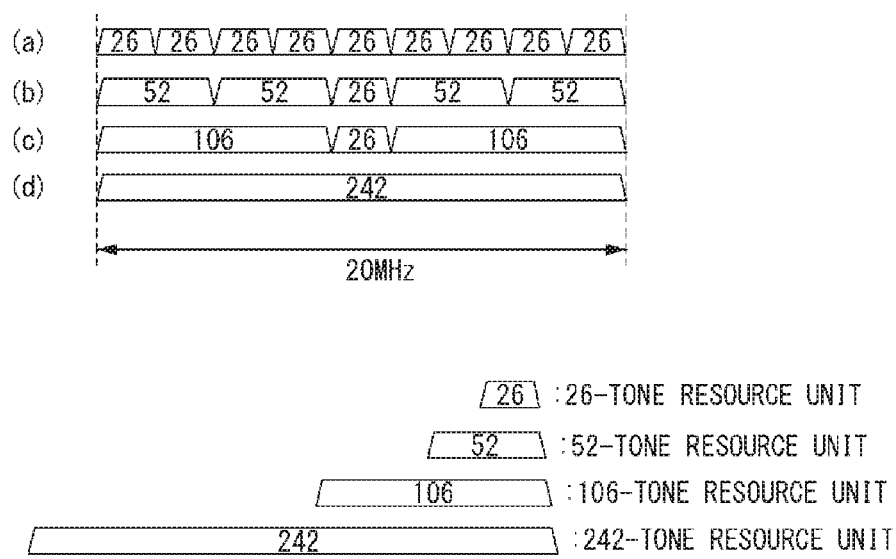
FIGS. 30 to 32 are diagrams illustrating a resource allocation unit in an OFDMA multi-user transmission method according to an embodiment of the present invention.
Figure 31:
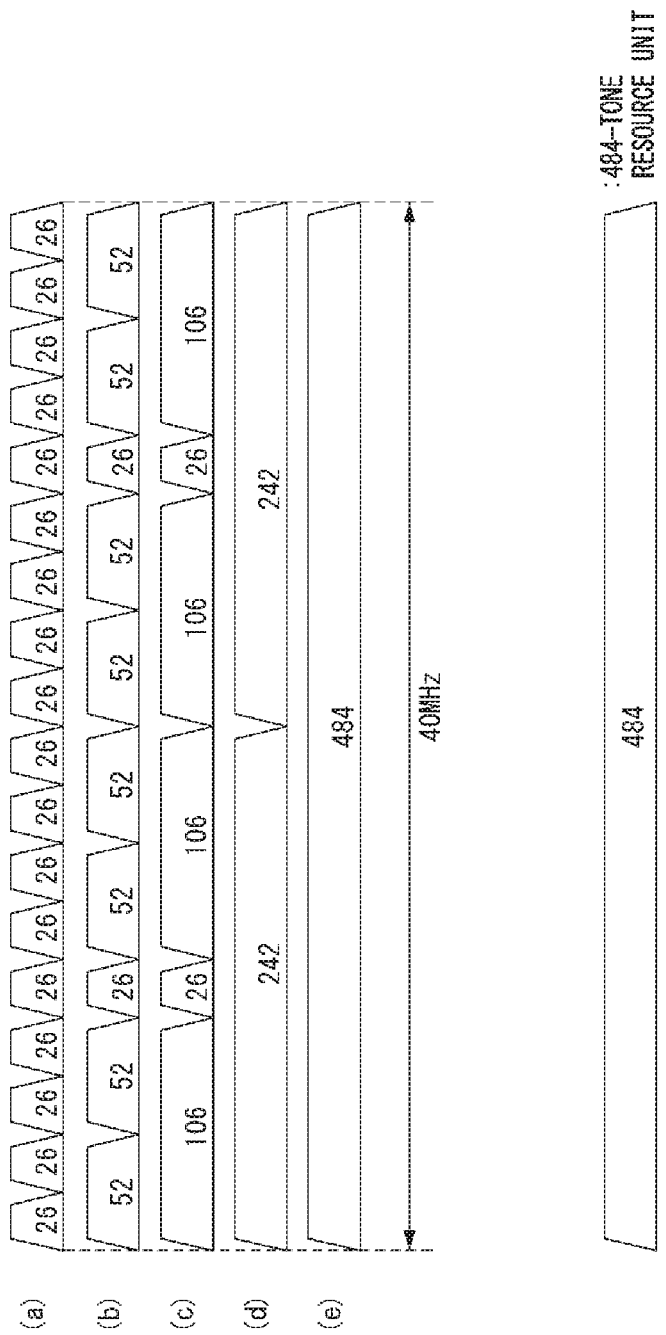
Figure 32:
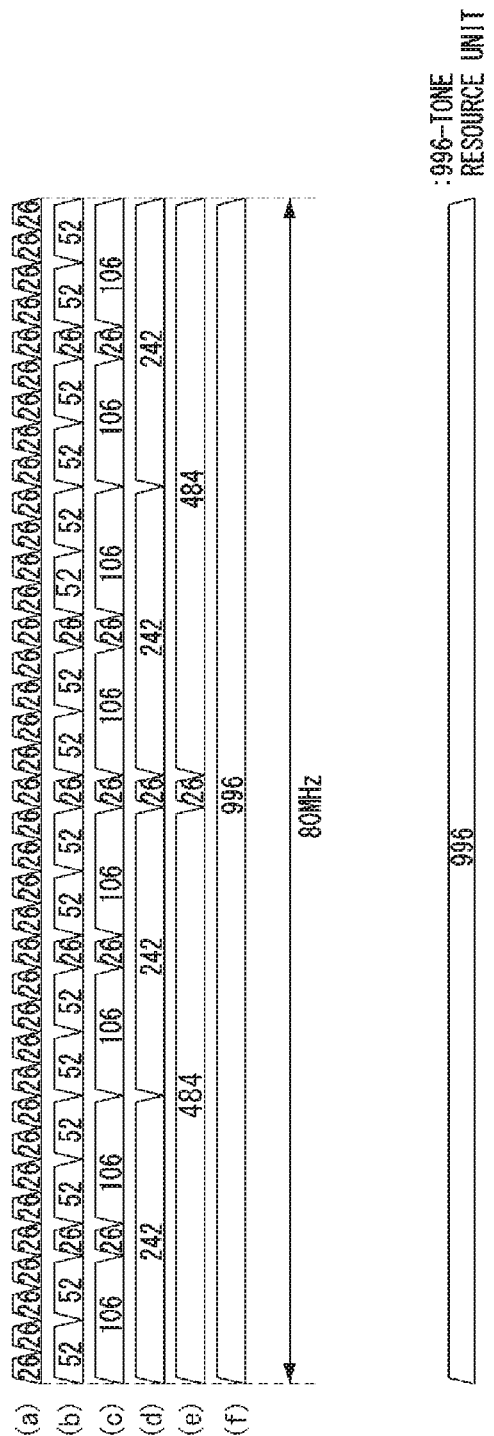

FIGS. 30 to 32 are drawings illustrating a resource allocation unit in an OFDMA multi-user transmission scheme according to an embodiment of the present invention.

When a DL/UL OFDMA transmission scheme is used, a plurality of resource units may be defined in units of n tones (or subcarriers) within a PPDU bandwidth.

A resource unit refers to an allocation unit of frequency resource for DIUUL OFDMA transmission.

One or more resource units may be allocated as DL/UL frequency resource to one STA and different resource units may be allocated to a plurality of STAs.

FIG. 30 illustrates a case in which a PPDU bandwidth is 20 MHz.

Seven DC tones may be positioned in a central frequency region of the 20 MHz PPDU bandwidth. Also, six left guard tones may and five right guard tones may be positioned on both sides of the 20 MHz PPDU bandwidth, respectively.

According to a resource unit configuration scheme such as that of FIG. 30(*a*), one resource unit may be comprised of 26 tones. Also, according to a resource unit configuration scheme such as that of FIG. 30(*b*), one resource unit may be comprised of 52 tone or 26 tones. Also, according to a resource unit configuration scheme such as that of FIG. 30(*c*), one resource unit may be comprised of 106 tone or 26 tones. Also, according to a resource unit configuration scheme such as that of FIG. 30(*d*), one resource unit may be comprised of 242 tones.

The resource unit comprised of 26 tones may include two pilot tones, the resource unit comprised of 52 tones may include four pilot tones, and the resource unit comprised of 106 tones may include four pilot tones.

In a case where a resource unit is configured as illustrated in FIG. 30(*a*), up to 9 STAs may be supported for DlJUUL OFDMA transmission in the 20 MHz band. Also, in a case where a resource unit is configured as illustrated in FIG. 30(*b*), up to 5 STAs may be supported for DUUL OFDMA transmission in the 20 MHz band. Also, in a case where a resource unit is configured as illustrated in FIG. 30(*c*), up to 3 STAs may be supported for DlJUL OFDMA transmission in the 20 MHz band. Also, in a case where a resource unit is configured as illustrated in FIG. 30(*d*). 20 MHz band may be allocated to one STA.

On the basis of the number of STAs participating in DL/UL OFDMA transmission and/or an amount of data transmitted or received by a corresponding STA, any one of the resource unit configuration schemes illustrated in FIGS. 30(*a*) to 30(*d*) may be applied or a combination of the resource unit configuration schemes of FIGS. 30(*a*) to 30(*d*) may be applied.

FIG. 31 illustrates a case in which a PPDU bandwidth is 40 MHz.

Five DC tones may be positioned in a central frequency region of the 40 MHz PPDU bandwidth. Also, 12 left guard tones and 11 right guard tones may be positioned on both sides of the 40 MHz PPDU bandwidth, respectively.

According to a resource unit configuration scheme illustrated in FIG. 31(*a*), one resource unit may be comprised of 26 tones. Also, according to a resource unit configuration scheme illustrated in FIG. 31(*b*), one resource unit may be comprised of 52 tones or 26 tones. Also, according to a resource unit configuration scheme illustrated in FIG. 31(*c*), one resource unit may be comprised of 106 tones or 26 tones. Also, according to a resource unit configuration scheme illustrated in FIG. 31(*d*), one resource unit may be comprised of 242 tones. Also, according to a resource unit configuration scheme illustrated in FIG. 31(*e*), one resource unit may be comprised of 484 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, and the resource unit comprised of 484 tones may include 16 pilot tones.

When a resource unit is configured as illustrated in FIG. 31(*a*), up to 18 STAs may be supported for DL/UL OFDMA transmission in the 40 MHz band. Also, when a resource unit is configured as illustrated in FIG. 31(*b*), up to 10 STAs may be supported for DIUUL OFDMA transmission in the 40 MHz band. Also, when a resource unit is configured as illustrated in FIG. 31(*c*), up to 6 STAs may be supported for DL/UL OFDMA transmission in the 40 MHz band. Also, when a resource unit is configured as illustrated in FIG. 31(*d*), up to 2 STAs may be supported for DL/UL OFDMA transmission in the 40 MHz band. Also, when a resource unit is configured as illustrated in FIG. 31(*e*), a corresponding resource unit may be allocated to one STA for SU DUUL transmission in the 40 MHz band.

On the basis of the number of STAs participating in DUUL OFDMA transmission and/or an amount of data transmitted or received by a corresponding STA, any one of the resource unit configuration schemes illustrated in FIGS. 31(*a*) to 31(*e*) may be applied or a combination of the resource unit configuration schemes of FIGS. 31(*a*) to 31(*e*) may be applied.

FIG. 32 illustrates a case in which a PPDU bandwidth is 80 MHz.

Seven DC tones may be positioned in a central frequency region of the 80 MHz PPDU bandwidth. However, in a case where the 80 MHz PPDU bandwidth is allocated to one STA (that is, in a case where a resource unit comprised of 996 tones is allocated to one STA), five DC tones may be positioned in the central frequency region. Also 12 left guard tones and 11 right guard tones may be positioned on both sides of the 80 MHz PPDU bandwidth, respectively.

According to a resource unit configuration scheme illustrated in FIG. 32(*a*), one resource unit may be comprised of 26 tones. Also, according to a resource unit configuration scheme illustrated in FIG. 32(*b*), one resource unit may be comprised of 52 tones or 26 tones. Also, according to a resource unit configuration scheme illustrated in FIG. 32(*c*), one resource unit may be comprised of 106 tones or 26 tones. Also, according to a resource unit configuration scheme illustrated in FIG. 32(*d*), one resource unit may be comprised of 242 tones or 26 tones. Also, according to a resource unit configuration scheme illustrated in FIG. 32(*e*), one resource unit may be comprised of 484 tones or 26 tones. Also, according to a resource unit configuration scheme illustrated in FIG. 32(*f*), one resource unit may be comprised of 996 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, the resource unit comprised of 484 tones may include 16 pilot tones, and the resource unit comprised of 996 tones may include 16 pilot tones.

When a resource unit is configured as illustrated in FIG. 32(*a*), up to 37 STAs may be supported for DUUL OFDMA transmission in the 80 MHz band. Also, when a resource unit is configured as illustrated in FIG. 32(*b*), up to 21 STAs may be supported for DUUL OFDMA transmission in the 80 MHz band. Also, when a resource unit is configured as illustrated in FIG. 32(*c*), up to 13 STAs may be supported for DUUL OFDMA transmission in the 80 MHz band. Also, when a resource unit is configured as illustrated in FIG. 32(*d*), up to 5 STAs may be supported for DULUL OFDMA transmission in the 80 MHz band. Also, when a resource unit is configured as illustrated in FIG. 32(*e*), up to 3 STAs may be supported for DUUL OFDMA transmission in the 80 MHz band. Also, when a resource unit is configured as illustrated in FIG. 32(*f*), a corresponding resource unit may be allocated to one STA for SU DIJUL transmission in the 80 MHz band.

On the basis of the number of STAs participating in DUUL OFDMA transmission and/or an amount of data transmitted or received by a corresponding STA, any one of the resource unit configuration schemes illustrated in FIGS.

32(a) to 32(f) may be applied or a combination of the resource unit configuration schemes of FIGS. 32(a) to 32(f) may be applied.

In addition, although not shown, a resource unit configuration scheme in a case where a PPDU bandwidth is 160 MHz may also be proposed. In this case, the 160 MHz PPDU bandwidth may have a structure in which the aforementioned 80 MHz PPDU bandwidth is repeated twice.

Among the entire resource units determined according to the aforementioned resource unit configuration schemes, only some resource units may be used for DL/UL OFDMA transmission. For example, in a case where resource units are configured as illustrated in FIG. 30(a) within 20 MHz, one resource unit is allocated to each of less than 9 STAs and the other resource units may not be allocated to any STA.

In the case of DL OFDMA transmission, a data field of a PPDU is multiplexed in a frequency domain by the resource unit allocated to each STA and transmitted.

Meanwhile, in the case of UL OFDMA transmission, each STA may configure a data field of a PPDU by the resource unit allocated thereto and simultaneously transmit the PPDU to an AP. In this manner, since each STA simultaneously transmits the PPDU, the AP, a receiver, may recognize that the data field of the PPDU transmitted from each STA is multiplexed in the frequency domain and transmitted.

Also, in a case where both DL/UL OFDMA transmission and DUUL MU-MIMO transmission are supported, one resource unit may include a plurality of streams in a spatial domain. Also, one or more streams may be allocated as a DL/UL spatial resource to one STA, and thus, different streams may be allocated to a plurality of STAs.

For example, a resource unit comprised of 106 tones in FIG. 30(c) includes a plurality of streams in the spatial domain to support both DUUL OFDMA and DlJUL MU-MIMO.

So far, the IEEE 802.11 ax WLAN system has been described. Hereinafter, a DlJUL MU data transmission method according to an embodiment of the present invention will be described.

DL MU Transmission of ACK Indication Information

In a case where an AP transmits a DL MU frame (that is, in a case where the AP DL MU-transmits a MAC frame to STAs), each STA may transmit an ACK/BA frame to the AP in response to the received DL MU frame. Here, the STAs may UL SU-transmit or UL MU-transmit the ACK/BA frame. In a case where each STA UL MU-transmits the ACK/BA frame. ACK indication information for UL MU transmission of the ACK/BA frame may be required. Here, the ACK indication information may indicate information for UL MU transmission of the ACK/BA frame, a response to data transmitted through a DL MU data field. Hereinafter, for the purposes of description, the ACK frame and the BA frame will be generally referred to as an "ACK frame".

ACK indication information according to an embodiment of the present invention may include various types of information such as resource allocation information, bandwidth information, channel information. MCS information, maximum PPDU length information, and the like.

—Resource Allocation Information

It is information regarding a UL MU resource (frequency resource and/or spatial resource) allocated to each STA to UL MU-transmit an ACK frame. IN a case where the ACK is frequency-multiplexed and UL MU-transmitted, resource allocation information may include information regarding a frequency resource allocated to each STA to transmit an ACK frame. Here, the resource allocation information may include frequency resource information allocated to each STA on the basis of a tone plan (please refer to FIGS. 30 to 32) corresponding to a bandwidth of a UL MU PPDU carrying the ACK frame.

In an embodiment, resource allocation information may inform each STA about in which of resource units in a certain frequency band an ACK frame is to be UL MU-transmitted. For example, resource allocation information may inform STA 1 that STA 1 shall transmit an ACK frame using first 52-tone resource unit of 20 MHz bandwidth.

In another embodiment, in a case where a resource allocation method is formed as a table like Table 13, resource allocation information may provide an index value corresponding to a resource allocated to each STA.

TABLE 13

| Index | Resource allcoation method |
|---|---|
| 0 | First 26-tone resource unit (first of 26 × 9 structure) |
| 1 | Second 26-tone resource unit (second of 26 × 9 structure) |
| ... | ... |
| 9 | First 52-tone resource unit (first of 52 × 4 + 26 × 1 structure) |
| ... | ... |

However, forming a table of all resource allocation methods by the bandwidths (20 MHz/40 MHz/80 MHz) may cause a problem that overhead is excessively increased. Thus, in order to reduce overhead, a resource allocation method of 20 MHz bandwidth may be formed as a table and resource allocation information may provide an index value corresponding to resource allocated to each STA. In this case, a bandwidth or channel information may be additionally provided together with the resource allocation information. For example, in a case where 484-tone resource unit is allocated to one STA, resource allocation information regarding the corresponding STA may indicate a 242-tone resource unit as an index start value and bandwidth information may indicate 40 MHz.

In addition, resource allocation information may include information regarding a spatial resource allocated to each STA to transmit an ACK frame.

A format of resource allocation information for UL MU transmission of the ACK frame may be the same as or different from a format of resource allocation information for DL MU transmission of a DL MU frame in an HE-SIG B field.

—Bandwidth Information

It is information regarding a bandwidth (20 MHz/40 MHz/80 MHz/160 MHz) of a UL MU PPDU carrying an ACK frame to be UL MU-transmitted.

—Channel Information

It is information indicating whether which 20 MHz channel has been allocated to each STA in a case where a bandwidth of a frequency resource allocated to each STA exceeds 20 MHz. For example, in a case where channel information is "00", the channel information may indicate that a first 20 MHz channel has been allocated, and in a case where channel information is "01", the channel information may indicate that a second 20 MHz channel has been allocated.

The bandwidth information and channel information may be simultaneously provided in various forms.

In an embodiment, bandwidth information and channel information may be provided in a bitmap form. For example, in a case where bandwidth information and channel information regarding STA 1 is "1100", it means that frequency resources of first and second 20 MHz channels among 80 MHz (20 MHz*4 bits) has been allocated to STA 1. That is, the bit number (n) included in a bit map may indicate bandwidth information (20 MHz*n) and a position of a bit having a bit value 1 may indicate channel information.

In another embodiment, bandwidth information and channel information may be provided in a table form. In this case, 3 bits may be required for indicating the bandwidth information and the channel information. For example, when bandwidth information and channel information are "000"~"011", it may indicate that first 20 MHz channel~fourth 20 MHz channel have been allocated, respectively, and "100" may indicate that a "first 40 MHz channel" has been allocated, "101" may indicate that a "second 40 MHz channel" has been allocated, and "111" may indicated that a "80 MHz channel" has been allocated.

The aforementioned embodiments are merely examples and the bandwidth information and channel information may be configured as various embodiments.

—MCS Information

It is information regarding an MCS level applied to an ACK frame to be UL MU-transmitted.

The MCS information may have a bit size of 4 to 5 bits and directly indicate an MCS level applied to an ACK frame. In this case, the MCS information may indicate every MCS level defined in a system.

Or, when it is assumed that a lower MCS level is applied to a UL MU-transmitted ACK frame for robust transmission. MCS information may indicate a difference value regarding an MCS level applied to an ACK frame and an MCS level applied to a DL MU frame. For example, When MCS information is "00", it may indicate that the same MCS level as that of a DL MU frame is applied to an ACK frame, When MCS information is "01", it may indicate that an MCS level one-step lower than that applied to a DL MU frame is applied to an ACK frame, When MCS information is "10", it may indicate that an MCS level two-step lower than that applied to a DL MU frame is applied to an ACK frame, and When MCS information is "11", it may indicate that an MCS level three-step lower than that applied to a DL MU frame is applied to an ACK frame.

Here, the higher/lower MCS level may refer to an MCS level indicating a modulation scheme in which a data bit number per symbol is greater/smaller, or may refer to an MCS level indicating a higher/lower code rate in a case where a modulation scheme is the same. A lower MCS level is more advantageous for robust transmission.

Or, MCS information may selectively indicate only a low MCS level for robust transmission, irrespective of an MCS level applied to a DL MU frame. For example, When MCS information is "00", it may indicate an MCS level 0 (e.g., BPSK modulation and ½ code rate coding), When MCS information is "01", it may indicate an MCS level 1 (e.g., QPSK modulation and ½ code rate coding), When MCS information is "10", it may indicate an MCS level 2 (e.g., QPSK modulation and ¾ code rate coding), and When MCS information is "11", it may indicate an MCS level 3 (e.g., 16QAM modulation and ½ code rate coding).

—Maximum Length Information of PPDU (or Maximum Length Information of ACK Frame)

It is maximum length information of a UL MU PPDU carrying an ACK frame. Or, it is length information of an ACK frame having a longest length among ACK frames carried by a UL MU PPDU.

ACK frames transmitted by each STA may have different lengths according to UL MU frequency resources used for UL MU transmission and applied MCS levels, but in order to prevent interference, all the ACK frames may be padded to have the same length and transmitted. Thus, in a case where each STA pads a UL MU PPDU (and/or ACK frame) to be transmitted by each STA such that a length thereof is the same as a maximum length of a UL MU PPDU (and/or maximum length information of the ACK frame), each STA may require maximum length information of the UL MU PPDU (and/or maximum length information of the ACK frame). The maximum length of the UL MU PPDU may be expressed by a micro second (us) unit or a symbol number unit.

In case where the maximum length of the UL MU PPDU is expressed by a symbol number unit, signaling overhead regarding the symbol number may be reduced by calculating the symbol number excluding 40 us of an always included physical preamble.

For example, a length of a UL MU PPDU, to which BPSK modulation and an MCS level of a ½ code rate are applied, and which is transmitted using a 26-tone resource unit, is about 400 us, and here, when the symbol number is calculated excluding a physical preamble, it is about 26 symbols. When the maximum length of the UL MU PPDU is considered, a bit size of maximum length information of the UL MU PPDU may be 5 bits (00000:1 symbol~11111:32 symbol)

—Others

In addition to the aforementioned information, various types of trigger information for UL MU transmission of an ACK frame such as buffer status report information, channel status report information, trigger information for random access of STAs, cyclic prefix (CP) length information, whether an STBC is used, a coding method, and the like, may be included.

These information items may be signaled in a preset manner according to an embodiment or may be signaled in the same manner as that of a signaling method of a DL MU frame. Also, the aforementioned information may be selectively included in ACK indication information and, besides the aforementioned information, additional information may be included in the ACK indication information.

Hereinafter, a method for transmitting the aforementioned ACK indication information will be described with reference to FIGS. 33 and 34.

A method for transmitting ACK indication information may be classified into two types as follows.

1. ACK indication information is included in physical preamble and transmitted

2. ACK indication information is included in data field and transmitted

An embodiment in which the ACK indication information is included in a physical preamble and transmitted will be described with reference to FIG. 33 and an embodiment in which the ACK indication information is included in a data field and transmitted will be described with reference to FIGS. 34 to 36.

Figure 33:
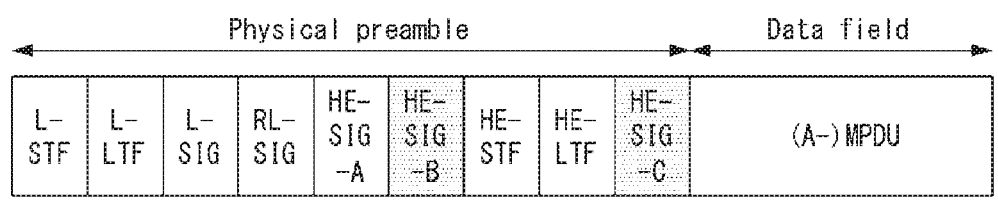
FIG. 33 is a diagram illustrating an embodiment of a 20 MHz DL MU PPDU in which ACK indication information is included in a physical preamble.

FIG. 33 is a diagram illustrating an embodiment of a 20 MHz DL MU PPDU in which ACK indication information is included in a physical preamble.

Referring to FIG. 33, the 20 MHz DL MU PPDU may include a physical preamble and a data field following the physical preamble. In detail, the 20 MHz DL MU PPDU may be configured in order of LSTF field→L-LTF field→L-SIG field→RL-SIG (Repeated L-SIG) field→HE-SIG A field→HE-SIG B field→HE-STF field→HE-LTF field→HE-SIG C field. The order of the fields may be changed according to an embodiment, a specific field may be added, and some fields may not be included.

The ACK indication information may be included in a HE-SIG B field or a HE-SIG C field of a physical preamble.

1. When Included in HE-SIG B Field

The ACK indication information may be included in the HE-SIG B field of a physical preamble and DL MU-transmitted. Here, the HE-SIG B field may include "common information (or a common field)" commonly required by reception STAs of a DL MU PPDU (DL MU-transmitted PPDU) and "user specific information (or a user specific field) individually required for reception STAs.

In an embodiment, the ACK indication information may be included in the common information or the user specific information of the HE-SIG B field. For example, in a case where the ACK indication information includes indication information regarding the entirety of reception STAs, the corresponding ACK indication information may be included in the common information of the HE-SIG B field. Or, in a case where the ACK indication information includes indication information for each reception STA, the corresponding ACK indication information may be included in the user specific information of the HE-SIG B field.

In another embodiment, the ACK indication information may be included in common information and user specific information of the HE-SIG B field. In detail, an ACK sub-indication information regarding the entirety of reception STAs included in the ACK indication information may be included in the common information and ACK sub-indication information of each reception STA included in the ACK indication information may be included in the user specific information.

For example, UL MU resource allocation information (i.e., sub-indication information) of the entirety of reception STAs for ACK frame transmission may be included in the common information. Or, UL MU resource allocation information (or sub-indication information) for each STA for ACK frame transmission may be included in the user-specific information. Or, information regarding an MCS level applied to an ACK frame by reception STAs may be included in the user specific information. Or, when the MCS levels applied to the reception STAs are the same, information regarding the corresponding MCS level may be included in the common information. Or, when it is assumed that ACK frames respectively transmitted from the reception STAs are padded to have the same length, maximum length information (i.e., sub-indication information) of the ACK frame may be included in the common information.

In addition, the sub-indication information included in the ACK indication information may be included in the common information or the user specific information according to characteristics, without being limited to the aforementioned embodiment.

2. When Included in HE-SIG C Field

The ACK indication information may be included in an HE-SIG C field of a physical preamble and DL MU-transmitted.

As mentioned above, in the case of 20 MHz DL MU PPDU, 64 FFTs are used up to HE-SIG B field, and 256 (4*64) FFTs may be used from the HE-STF. In this case, each STA may obtain information regarding DL MU resource allocated to each STA using DL MU resource allocation information included in the HE-SIG B field. Since the HE-SIG C field is positioned behind the HE-SIF, it may be transmitted using resource separately allocated to each STA, and thus, the HE-SIG C field may be used for transmitting information specific to each STA. Thus, the AP may DL MU-transmit ACK indication information for ACK frame transmission of each STA in the HE-SIG C field.

In this manner, the ACK indication information included in the physical preamble may be DL MU-transmitted to each STA through the DL MU PPDU, and each STA may UL MU-transmit an ACK frame using the UL MU resource allocated thereto according to the received ACK indication information.

Figure 34:
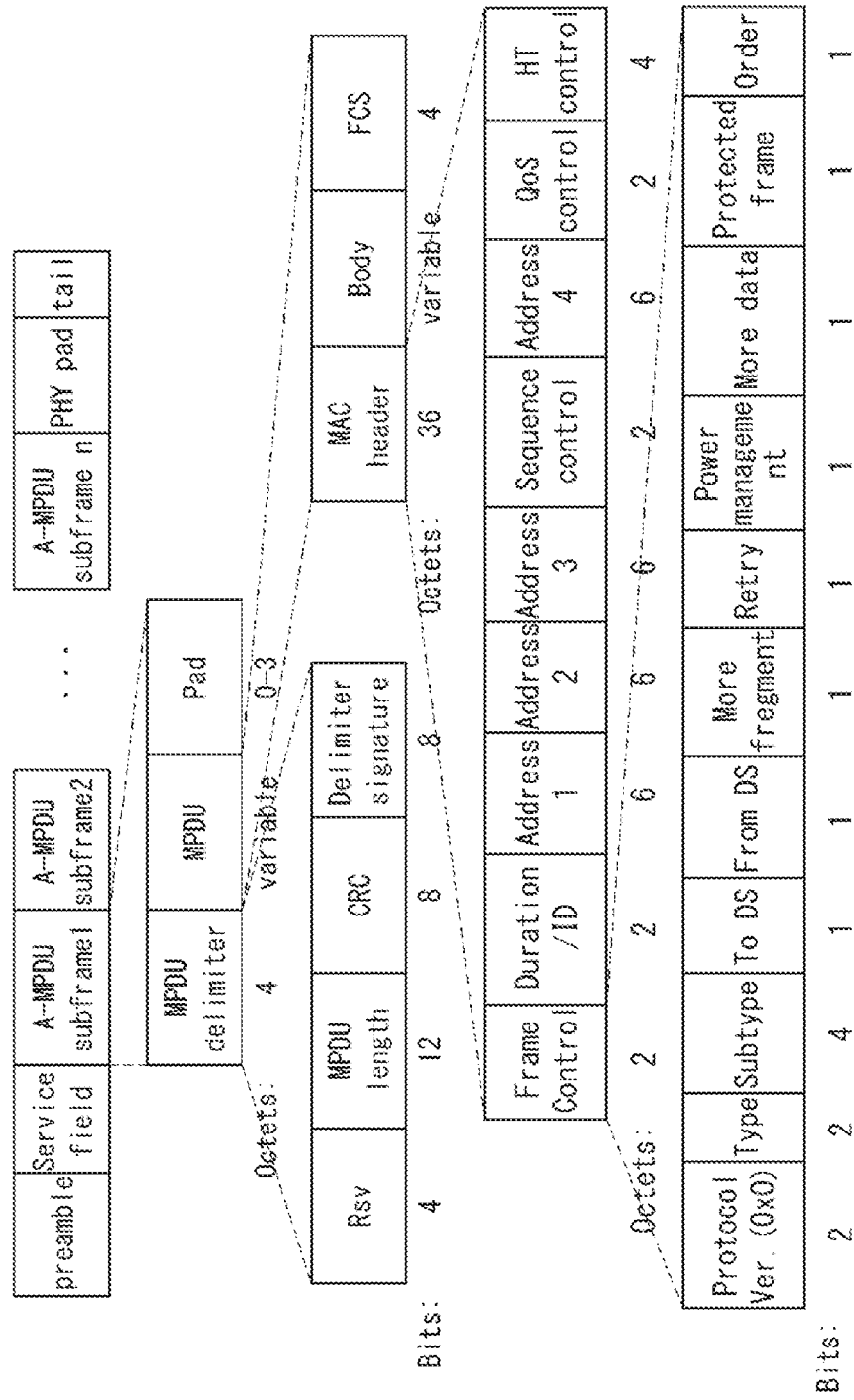
FIG. 34 is a diagram illustrating an embodiment of 20 MHz DL MU PPDU in which ACK indication information is included in a data field.

FIG. 34 is a diagram illustrating an embodiment of a 20 MHz DL MU PPDU in which ACK indication information is included in a data field. The fields illustrated in FIG. 34 are the same as those described above with reference to FIGS. 6, 7 and 17, and thus, repeated descriptions thereof will be omitted.

ACK indication information may be included in a data field in various embodiments. For example, in a case where the data field includes an A-MPDU, the ACK indication information may be included in a MAC header of at least one MPDU included in the A-MPDU. Or, the ACK indication information may be included in a MAC frame body of at least one MPDU included in the A-MPDU. Hereinafter, an embodiment in which the ACK indication information is included in an MAC header will be described.

In an embodiment, the ACK indication information may be included in a frame control field included in the MAC header. In the related art, an option in which bit values of a To DS field and From DS field included in the frame control field are 1 is used to indicate a mesh BSS. However, in the present invention, such an option may be used as an indicator indicating whether ACK indication information is included in the MAC header. Thus, in a case where the To DS field and From DS field values are set to 1 (that is, in a case of indicating that the ACK indication information is included), an address 4 field (6 octets) may be used as a field for transmitting ACK indication information.

In another embodiment, the ACK indication information may be included in the control field included in the MAC header. In detail, the ACK indication information may be included in an HT control field (4 octets) included in a MAC header of an HT format MPDU. Or, the ACK indication information may be included in an HE control field included in a MAC header of an HE format MPDU newly defined in a 802.1 lax system.

Here, the HE control field (4 octets) may be a field in which the HT control field is newly configured to fit the 802.11x system. Or, the HE control field (10 octets) may be a field newly configured by adding the aforementioned address 4 field (6 octets) and the HT control field (4 octets). Or, the HE control field may be a field newly configured to have a size of 4 to 6 octets in the place of the HT control field consisting of 4 octets in an HT format.

As described above, the ACK indication information may be included in various fields included in the MAC header in various embodiments. In this case, the MAC header may additionally include an indicator indicating that it includes the ACK indication information. Hereinafter, various embodiments of the indicator will be described.

Indicator Indicating that ACK Indication Information is Included

The A-MPDU subframe may include an indicator indicating that a MAC header included therein includes ACK indication information. The indicator may be included in the subframe of the A-MPDU in various embodiments.

1) First Embodiment

The indicator may be included in an MPDU delimiter corresponding to a MAC header including ACK indication information. In detail, an MPDU delimiter field included in one A-MPDU subframe may include an indicator indicating that the MAC header included in the A-MPDU subframe includes the ACK indication information. For example, a specific bit (1 bit) among reserved bits (4 bits) included in the MPDU delimiter field may serve as an indicator. In a case where the specific bit value serving as an indicator is set to a preset value (e.g., 1), it may indicate that a MAC header including the indicator includes the ACK indication information.

Also, the indicator included in the MPDU delimiter field may additionally indicate that an MPDU corresponding to the MPDU delimiter field includes an HE control field newly defined in the 802.11 ax SYSTEM. In detail, a MPDU delimiter field included in one A-MPDU subframe may additionally indicate that the MPDU included in the A-MPDU subframe includes the HE control field. Here, the ACK indication information may be included in the HE control field. In this case, the MPDU including the corresponding HE control field may not correspond to an HT control wrapper frame.

2) Second Embodiment

In a case where a type or a sub-type of the MPDU including the ACK indication information is newly defined in the 802.1 lax system, the indicator may be included in the frame control field of the MAC header of the MPDU, as a newly defined type or sub-type. That is, the type or sub-type of the MPDU may indicate, as an indicator, that the corresponding MPDU is an MPDU including ACK indication information within a MAC header. In this case, the type or sub-type as the indicator may be newly defined in the 802.11 lax system.

3) Third Embodiment

In a case where the MPDU including the ACK indication information corresponds to an HT format frame (e.g., an HT control wrapper frame) including the HT control field, a specific bit within the HT control field may serve as an indicator. In detail, a specific bit among reserved bits included in the HT control field may serve as an indicator, and in a case where the corresponding specific bit is set by a preset value, it may indicate that the corresponding HT control field includes the ACK indication information.

4) Fourth Embodiment

FIG. 35 is a drawing illustrating a control field of an HT format. Referring to FIG. 35, a first bit of the control field may serve as an indicator indicating that a corresponding control field is a VHT control field of a VHT format. For example, in a case where a value of a first bit of the control field is set to a preset value (e.g., 1), it may indicate that the corresponding control field is a VHT control field.

Similarly, a second bit (reserved bit) 3510 of the HT control field may include ACK indication information, and may serve as an indicator indicating that the corresponding control field is an HE control field of an HE format newly defined in the 802.1 lax system. For example, in a case where a first bit of the control field indicates a VHT format and a second bit 3510 indicates inclusion of the ACK indication information (or an HE format) (or in a case where the second bit 3510 is set to a preset value (e.g., 1), it may indicate that the corresponding field is an HE control field including the ACK indication information.

The HE control field may be newly configured using an HT control field, and details of a configuration of the HE control field will be described with reference to FIG. 36.

5) Fifth Embodiment

The indicator may be included in a specific field among fields included in the MAC header. In detail, the indicator may be included in a specific field that can be reinterpreted among the fields included in the MAC header.

For example, as described above with reference to FIG. 34, In the related art, an option in which bit values of a To DS field and From DS field included in the frame control field are 1 is used to indicate a mesh BSS. However, in the present invention, such an option may be used as an indicator indicating whether ACK indication information is included in the MAC header. Thus, in a case where the To DS field and From DS field values are set to 1 (that is, in a case of indicating that the ACK indication information is included), an address 4 field (6 octets) may be used as a field for transmitting ACK indication information. In this case, the To DS field and From DS field may serve as an indicator, and, through the To DS field and From DS field, it may be indicated that the MAC header including the fields include the ACK indication information.

Or, in another example, a specific bit (e.g., 12th bit (B12) from the most significant bit (MSB) of an AID field) included in a specific address field included in the MAC header may serve as an indicator.

So far, various embodiments of the indicator have been described. The indicator may be included in the MAC header in various embodiments to indicate that a corresponding MAC header includes the ACK indication information, without being limited to the aforementioned embodiment.

Hereinafter, a configuration of the HE control field described above in relation to the fourth embodiment will be described in detail.

Figure 36:
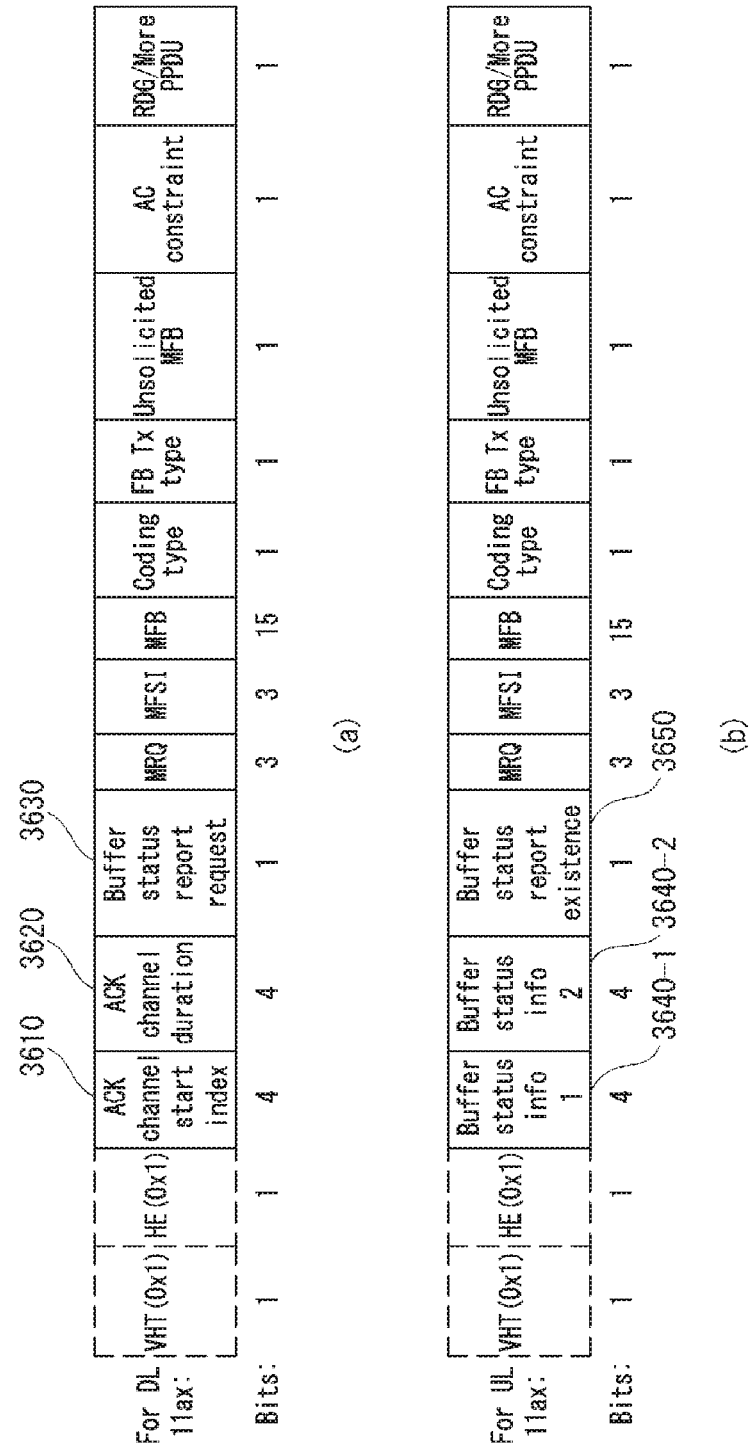
FIG. 36 is a diagram illustrating an HE control field according to an embodiment of the present invention.

FIG. 36 is a diagram illustrating an HE control field according to an embodiment of the present invention.

Descriptions of some fields included in the HT control field (described above with reference to FIG. 8) may also be applied in the same manner to some fields included in the HE control field in FIG. 36. Thus, only differences from the HT control field will be described. The fields illustrated in FIG. 36 may be independently present, may be selectively included in the HE control field, and order of the fields and bit sizes may be modified according to embodiments.

Referring to FIG. 36, unlike the HT control format, the HE control field may include an indicator and ACK indication information. Also, as described above, a first bit of the HE control field may indicate that the corresponding control bit is in a VHT format and a second bit may indicate that the corresponding control bit is in an HE format.

FIG. 36(a) is a drawing illustrating a DL MU-transmitted HE control field.

Referring to FIG. 36(a), the HE control field may include at least one of ACK channel information for UL MU transmission of the ACK frame, butter status report request information (1 bit) 3630, and channel status report (1 bit) (not shown). Here, the ACK channel information refers to resource allocation information as information regarding UL MU resource allocated to each STA to UL MU-transmit an ACK frame, and the descriptions and embodiment of the resource allocation information described above may be applied in the same manner. Here, the ACK channel information may include ACK channel start index information (4 bits) 3610 and ACK channel duration information (4 bits) 3620 as another embodiment of the aforementioned resource allocation information.

When it is assumed that "one ACK channel" is a minimum allocation unit of UL MU resource for the ACK frame, start index information 3610 of the ACK channel and duration information 3620 of the ACK channel indicating a size (or the number) of the ACK channel may be required. In this case, bit sizes of the start index information 3610 and the duration information 3620 of the ACK channel may be determined on the basis of a maximum number of STAs (or users) to which the DL MU resource may be allocated. For example, in a case where the maximum number of STAs to which the DL MU resource (including a frequency resource and a space resource) can be allocated is 16 (0.2^4 bits), the start index information 3610 and the duration information 3620 of the ACK channel may have a bit size of 4 bits.

In a case where the sizes (or numbers) of the ACK channels respectively allocated to the STAs are set to be the same (that is, in a case where the MCS level applied to the ACK frame is fixed), the duration information 3620 of the ACK channel may not be required. Or, in a case where an MCS level determined on the basis of an MCS level applied to a DL frame is applied to the ACK frame, ACK channel information may indicate a difference value between the MCS level applied to a DL frame and the MCS level applied to the ACK frame. For example, the ACK channel information may indicate "−2, −1, 0, 1" as a difference value (specifically, the MCS level applied to the ACK frame−the MCS level applied to the DL frame) between the MCS level applied to the ACK frame and the MCS level applied to the DL frame, and may be signaled by a bit size of 2 bits.

In the aforementioned embodiment, it is assumed that a size (or the number) of the ACK channel is fixed according to an MCS level applied to the ACK frame.

In addition, the HE control field may further include various information items (e.g., bandwidth information, MCS information, maximum PPDU length information, and the like) included in the aforementioned ACK indication information.

FIG. 36(*b*) is a drawing illustrating a UL MU-transmitted HE control field.

Referring to FIG. 36(*b*), the HE control field may include at least one of buffer status information (8 bits) (3640-1, 3640-2), whether there is contents for reporting a butter status, and channel information. The buffer status information may include two fields, and a bit size of each field may 4 bits. The buffer status information may indicate a queue size, an access category (AC), a backoff count, and the like.

A type indicator indicating a type of information that may be included in the HE control field may be included in a field ahead of the HE control field (or preceding field).

Error Recovery

In a case where a data field of a DL MU PPDU is configured as an AN-MPDU, the AP may include ACK indication information in each MAC header of every MPDU forming the A-MPDU or may include ACK indication information in a MAC header of a partial MPDU (e.g., a first MPDU among MPDUs forming the A-MPDU).

In a case where the AP includes the ACK indication information in each MAC header of every MPDU forming the A-MPDU, repeated information is included in every MPDU, disadvantageously increasing overhead. Conversely, in a case where the AP includes the ACK indication information in the MAC header of a partial MPDU, overhead may be reduced but if a STA fails to decode the corresponding partial MPDU, it cannot UL MU-transmit an ACK frame. In order to prevent such a problem, in a case where the ACK indication information is included in the MAC header of the partial MPDU, a predetermined error recovery procedure may be required. Hereinafter, the error recovery procedure according to an embodiment of the present invention will be described in detail.

Figure 37:
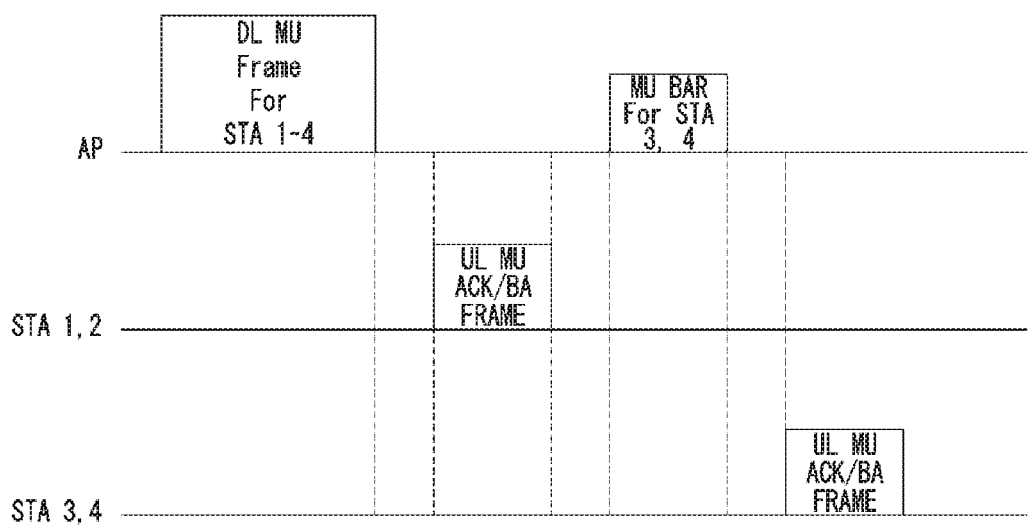
FIG. 37 is a diagram schematically illustrating an error recovery procedure according to an embodiment of the present invention.

FIG. 37 is a drawing schematically illustrating an error recovery procedure according to an embodiment of the present invention. Hereinafter, it is assumed that an AP transmits a DL MU frame (or DL data) to STAs 1 to 4 and the STAs 1 to 4, upon receiving the DL MU frame (or DL data) UL MU-transmits an ACK frame in response to the received DL MU frame (or DL data).

Referring to FIG. 37, the AP may transmit a DL MU frame (or DL data) to the STAs 1 to 4 using DL MU resource. In this case. ACK indication information for UL MU transmission of an ACK frame may be included in a partial MAC header of the DL MU frame (or DL data) transmitted to each STA.

When the STAs 1 and 2 normally receive the DL MU frame (or DL data), the STAs 1 and 2 each may UL MU-transmit an ACK frame in response to the DL MU frame (or DL data) after the lapse of a predetermined time. In this case, the STAs 1 and 2 may UL MU-transmit the ACK frame using a UL MU resource indicated by the ACK indication information included in the partial MAC header of the received DL MU frame (or DL data).

The STAs 3 and 4, which have not normally received the DL MU frame (or DL data) or the ACK indication information, cannot UL MU-transmit an ACK frame in response to the DL MU frame (or DL data).

In this case, after the AP UL MU-receives the ACK frames from the STAs 1 and 2, it may DL MU-transmit an MU BAR frame to the STAs 3 and 4 which have failed to UL MU-transmit an ACK frame after the lapse of a predetermined time (e.g., SIFS). Or, after performing a backoff procedure to re-transmit the DL MU frame (or DL data) to the STAs 3 and 4, the AP may DL MU-transmit the MU BAR frame through channel contention. The MU BAR frame may include STA IDs of the STAs which have failed in UL MU transmission of an ACK frame and new indication information for UL MU transmission of an ACK frame.

In this case, the STAs 3 and 4 obtain an opportunity to UL MU-transmit an ACK frame. On the basis of the received MU BAR, the STAs 3 and 4 may UL MU-transmit an ACK frame.

If the STAs 3 and 4 do not UL MU-transmit the ACK frame even after the AP has transmitted the MU BAR, the AP may determine that the STAs 3 and 4 have not properly decoded the DL MU frame (or DL data), and perform a follow-up procedure such as re-transmission of the DL MU frame (or DL data), or the like.

In another embodiment, STAs, which have received the DL MU frame (or DL data) but have not UL MU-transmitted an ACK frame because they failed to receive ACK indication information, may UL SU-transmit an ACK frame through channel contention. Here, the ACK frame may be a stand-along frame included solely in a UL frame or may be a frame piggybacked to a data frame of the UL frame.

In this case, since the AP cannot keep waiting for receiving an ACK frame from the STAs, a predetermined waiting time may be set and the AP may wait for UL SU-receiving an ACK frame only for the waiting time. In a case where ACK frames are not received from the corresponding STAs for the waiting time, the AP may determine that the STAs which have not transmitted the ACK frames are STAs which have not properly decoded a DL MU frame (or DL data), and perform a follow-up procedure such as re-transmission of a DL MU frame (or DL data).

Or, the AP may receive a BAR request and/or ACK frame from the STAs which has failed to UL MU-transmit an ACK frame, during a backoff procedure for re-transmitting the DL MU frame (or DL data) or in the course of transmitting an MU BAR frame. In this case, the AP may perform the follow-up procedure such as re-transmission of the DL MU frame (or DL data) and/or transmission of the BAR frame on the basis of a received BAR request and/or ACK frame.

In another embodiment, STAs, which have received a DL MU frame (or DL data) but failed to UL MU-transmit an ACK frame because they had failed to receive ACK indication information, may request a BAR frame from the AP during a random access interval (e.g., a next random access interval or an random access interval designated by the AP) or directly transmit an ACK frame to the AP.

Here, since the AP cannot keep waiting for receiving an ACK frame or a BAR frame request, a predetermined waiting time may be set and the AP may wait for receiving an ACK frame or a BAR frame request only for the waiting time. In a case where an ACK frame or a BAR frame request is not received from the corresponding STAs for the waiting time, the AP may determine that the STAs which have not transmitted an ACK frame are STAs which had not properly decoded a DL MU frame (or DL data), AND perform a follow-up procedure such as re-transmission of the DL MU frame (or DL data).

Or, the AP may receive a BAR request and/or ACK frame from the STAs which have failed to UL MU-transmit an ACK frame during a backoff procedure for re-transmitting the DL MU frame (or DL data) or in the course of transmitting a MU BAR frame. In this case, the AP may perform a follow-up procedure such as retransmission of the DL MU frame (or DL data) and/or BAR frame transmission on the basis of the received BAR request and/or ACK frame.

Figure 38:
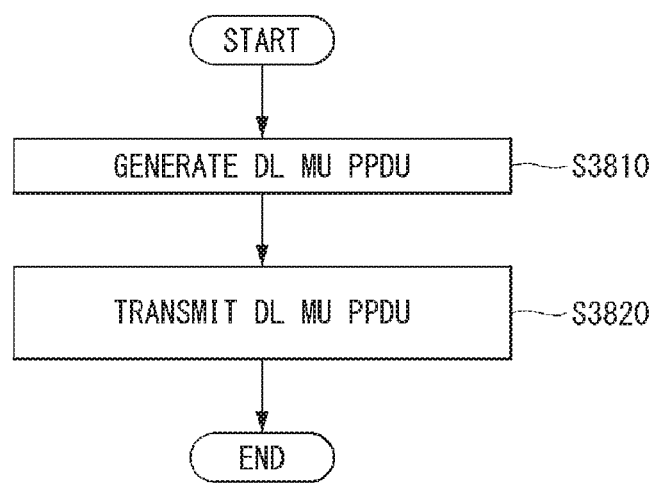
FIG. 38 is a flow chart illustrating a DL MU transmission method of an AP device according to an embodiment of the present invention.

FIG. 38 is a flow chart illustrating a DL MU transmission method of an AP device according to an embodiment of the present invention. The aforementioned embodiments may be applied in the same manner in relation to the flow chart. Thus, hereinafter, repeated descriptions will be omitted.

Referring to FIG. 38, an AP may generate a DL MU PPDU (S3810). Here, the DL MU PPDU may include a physical preamble and a data field. The data field may include at least one MPDU, and here, the at least one MPDU may include a MAC header and a MAC frame body. Also, the MAC header includes ACK indication information for UL MU transmission of an ACK frame as a response to data transmitted through the data field.

Thereafter, the AP may transmit a DL MU PPDU (S3820). In detail, the AP may transmit a DL MU PPDU to at least one STA which has been allocated a DL resource.

Figure 39:
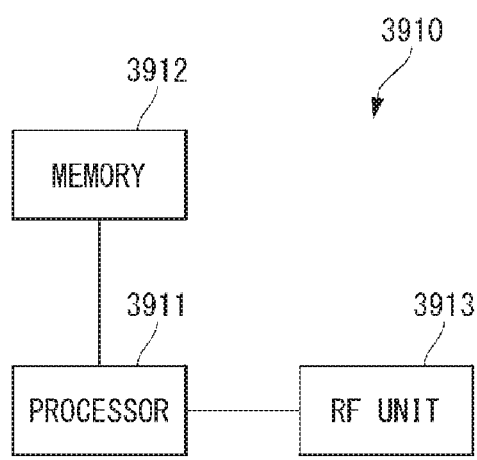
FIG. 39 is a block diagram of each STA device according to an embodiment of the present invention.

FIG. 39 is a block diagram of each STA device according to an embodiment of the present invention.

In FIG. 39, an STA device 3910 may include a memory 3912, a processor 3911 and an RF unit 3913. And, as described above, the STA device may be an AP or a non-AP STA as an HE STA device.

The RF unit 3913 may transmit/receive a radio signal with being connected to the processor 3911. The RF unit 3913 may transmit a signal by up-converting the data received from the processor 3911 to the transmission/reception band.

The processor 3911 may implement the physical layer and/or the MAC layer according to the IEEE 802.11 system with being connected to the RF unit 4013. The processor 3911 may be constructed to perform the operation according to the various embodiments of the present invention according to the drawings and description. In addition, the module for implementing the operation of the STA 3910 according to the various embodiments of the present invention described above may be stored in the memory 3912 and executed by the processor 3911.

The memory 3912 is connected to the processor 3911, and stores various types of information for executing the processor 3911. The memory 3912 may be included interior of the processor 3911 or installed exterior of the processor 3911, and may be connected with the processor 3911 by a well known means.

In addition, the STA device 3910 may include a single antenna or a multiple antenna.

The detailed construction of the STA device 3910 of FIG. 39 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While a frame transmission scheme in a wireless communication system according to the present invention has been described with respect to its application to an IEEE 802.11 system, it also may be applied to other various wireless communication systems than the IEE 802.11 system.

What is claimed is:

1. A downlink (DL) multi-user (MU) transmission method in a wireless local area network (WLAN) system, the DL MU transmission method comprising:
   receiving a DL MU physical protocol data unit (PPDU) including a physical preamble and a data field from a STA (Station); and
   transmitting the ACK frames in response to the DL MU PPDU to the STA,
   wherein the data field includes at least one medium access control (MAC) protocol data unit (MPDU), the at least one MPDU includes a MAC header and a MAC frame body,
   wherein the MAC header includes acknowledge (ACK) indication information,
   wherein the ACK indication information includes frequency resource allocation information for an uplink (UL) MU orthogonal frequency division multiple access (OFDMA) transmission of ACK frames and modulation and coding scheme (MCS) level information, and
   wherein the frequency resource allocation information includes an index value indicating a resource unit allocated for the UL MU OFDMA transmission of the ACK frames, and the resource unit corresponds to a 26-tone resource unit, a 52-tone resource unit, a 106-tone resource unit, a 242-tone resource unit, a 484-tone resource unit, or a 996-tone resource unit.

2. The DL MU transmission method of claim 1, wherein the MAC header includes an indicator indicating whether the ACK indication information is included or not.

3. The DL MU transmission method of claim 2, wherein the indicator is included in a high efficiency (HE) control field included in the MAC header.

4. The DL MU transmission method of claim 3, wherein the ACK indication information is included in the HE control field of the MAC header.

5. The DL MU transmission method of claim 4, wherein the ACK indication information further includes length information of a UL MU PPDU carrying the ACK frames.

6. The DL MU transmission method of claim 1, wherein the MCS level information indicates an MCS level applied to the ACK frames.

7. The DL MU transmission method of claim 6, wherein the MCS level applied to the ACK frames is selected among a predetermined number of lowest MCS levels.

8. The DL MU transmission method of claim 7,
   wherein the MCS level information indicates one of MCS levels 0 to 3, and
   wherein the MCS level 0 indicates BPSK modulation and ½ code rate coding, the MCS level 1 indicates QPSK modulation and ½ code rate coding, the MCS level 2 indicates QPSK modulation and ¾ code rate coding, and the MCS level 3 indicates 16QAM modulation and ½ code rate coding.

9. The DL MU transmission method of claim 5, wherein the length information indicates a length of the UL MU PPDU in an Orthogonal Frequency Division Multiple (OFDM) symbol number unit.

10. A Station (STA) device in a wireless local area network (WLAN) system, the STA device comprising:
    a transceiver configured to transmit and receive a wireless signal; and
    a processor configured to control the transceiver,
    wherein the processor is further configured to:
    receive a DL MU physical protocol data unit (PPDU) including a physical preamble and a data field from STA(Station); and
    transmit the ACK frames in response to the DL MU PPDU to the STA,
    wherein the data field includes at least one medium access control (MAC) protocol data unit (MPDU), the at least one MPDU includes a MAC header and a MAC frame body,
    wherein the MAC header includes acknowledge (ACK) indication information,
    wherein the ACK indication information includes frequency resource allocation information for an uplink (UL) MU orthogonal frequency division multiple access (OFDMA) transmission of ACK frames and modulation and coding scheme (MCS) level information, and
    wherein the frequency resource allocation information includes an index value indicating a resource unit allocated for the UL MU OFDMA transmission of the ACK frames, and the resource unit corresponds to a 26-tone resource unit, a 52-tone resource unit, a 106-tone resource unit, a 242-tone resource unit, a 484-tone resource unit, or a 996-tone resource unit.

11. The STA device of claim 10, wherein the MAC header includes an indicator indicating whether the ACK indication information is included or not.

12. The STA device of claim 11, wherein the indicator is included in a high efficiency (HE) control field included in the MAC header.

13. The STA device of claim 12, wherein the ACK indication information is included in the HE control field of the MAC header.

14. The STA device of claim 13, wherein the ACK indication information further includes length information of a UL MU PPDU carrying the ACK frames.

15. The STA device of claim 10, wherein the MCS level information indicates an MCS level applied to the ACK frames.

16. The STA device of claim 15, wherein the MCS level applied to the ACK frames is selected among a predetermined number of lowest MCS levels.

17. The STA device of claim 16,
    wherein the MCS level information indicates one of MCS levels 0 to 3, and
    wherein the MCS level 0 indicates BPSK modulation and ½ code rate coding, the MCS level 1 indicates QPSK modulation and ½ code rate coding, the MCS level 2 indicates QPSK modulation and ¾ code rate coding, and the MCS level 3 indicates 16QAM modulation and ½ code rate coding.

18. The STA device of claim 17, wherein the length information indicates a length of the UL MU PPDU in an Orthogonal Frequency Division Multiple (OFDM) symbol number unit.

* * * * *